US008805861B2

(12) United States Patent  
Boyan et al.

(10) Patent No.: US 8,805,861 B2  
(45) Date of Patent: Aug. 12, 2014

(54) METHODS AND SYSTEMS TO TRAIN MODELS TO EXTRACT AND INTEGRATE INFORMATION FROM DATA SOURCES

(75) Inventors: Justin Boyan, Providence, RI (US); Glenn McDonald, Cambridge, MA (US); Margaret Benthall, Cambridge, MA (US); Ray Molnar, Duxbury, MA (US)

(73) Assignee: Google Inc., Mountain View, CA (US)

( * ) Notice: Subject to any disclaimer, the term of this patent is extended or adjusted under 35 U.S.C. 154(b) by 998 days.

(21) Appl. No.: 12/467,235

(22) Filed: May 15, 2009

(65) Prior Publication Data

US 2010/0145902 A1 Jun. 10, 2010

Related U.S. Application Data

(60) Provisional application No. 61/121,013, filed on Dec. 9, 2008, provisional application No. 61/150,003, filed on Feb. 4, 2009.

(51) Int. Cl.  
*G06F 7/00* (2006.01)

(52) U.S. Cl.  
USPC .......................................... 707/756; 707/798

(58) Field of Classification Search  
CPC ..... G10L 15/183; G10L 15/142; G10L 15/18; G10L 15/1815; G10L 15/193; G06F 17/30401; G06F 17/30654; G06F 17/2795; G06F 17/28; G06F 17/30616; G06F 17/30911  
USPC ........... 704/231, 234, 250, 256, 256.1, 256.2, 704/256.3, 256.4, 224, 242; 706/16, 19, 706/12–13, 25; 395/23, 77; 707/791, 793, 707/797, 798, 602, 756, 742; 700/28–31, 700/97–99  
See application file for complete search history.

(56) References Cited

U.S. PATENT DOCUMENTS 5,781,701 A 7/1998 Wang  
5,926,820 A 7/1999 Agrawal et al.  
(Continued)

OTHER PUBLICATIONS

Beuster, et al., (2000) MIA an Ubiquitous Multi-Agent Web Information System; In Proceedings of International ICSC Symposium on Multi-Agents and Mobile Agents in Virtual Organizations and E-Commerce (MAMA 2000).

(Continued)

*Primary Examiner* — James Trujillo  
*Assistant Examiner* — Linh Black  
(74) *Attorney, Agent, or Firm* — Morgan, Lewis & Bockius LLP

(57) ABSTRACT

Methods and systems to model and acquire data from a variety of data and information sources, to integrate the data into a structured database, and to manage the continuing reintegration of updated data from those sources over time. For any given domain, a variety of individual information and data sources that contain information relevant to the schema can be identified. Data elements associated with a schema may be identified in a training source, such as by user tagging. A formal grammar may be induced appropriate to the schema and layout of the training source. A Hidden Markov Model (HMM) corresponding to the grammar may learn where in the sources the elements can be found. The system can automatically mutate its schema into a grammar matching the structure of the source documents. By following an inverse transformation sequence, data that is parsed by the mutated grammar can be fit back into the original grammar structure, matching the original data schema defined through domain modeling. Features disclosed herein may be implemented with respect to web-scraping and data acquisition, and to represent data in support of data-editing and data-merging tasks. A schema may be defined with respect to a graph-based domain model.

24 Claims, 10 Drawing Sheets

(56) References Cited

U.S. PATENT DOCUMENTS

| | | | |
|---|---|---|---|
| 6,044,398 A | 3/2000 | Marullo et al. | |
| 6,076,057 A | 6/2000 | Narayanan et al. | |
| 6,102,969 A | 8/2000 | Christianson et al. | |
| 6,112,021 A | 8/2000 | Brand | |
| 6,295,533 B2 | 9/2001 | Cohen | |
| 6,300,957 B1 | 10/2001 | Rao et al. | |
| 6,314,420 B1 | 11/2001 | Lang et al. | |
| 6,405,207 B1 | 6/2002 | Petculescu et al. | |
| 6,418,432 B1 | 7/2002 | Cohen et al. | |
| 6,470,333 B1 | 10/2002 | Baclawski | |
| 6,484,166 B1 | 11/2002 | Maynard | |
| 6,516,308 B1 | 2/2003 | Cohen | |
| 6,535,881 B1 | 3/2003 | Baclawski | |
| 6,591,146 B1 | 7/2003 | Pavlovic et al. | |
| 6,628,312 B1 | 9/2003 | Rao et al. | |
| 6,640,231 B1 | 10/2003 | Andersen et al. | |
| 6,675,159 B1 | 1/2004 | Lin et al. | |
| 6,703,270 B2 | 3/2004 | Knotter et al. | |
| 6,722,148 B2 | 4/2004 | Aoki et al. | |
| 6,816,830 B1 | 11/2004 | Kempe | |
| 6,829,599 B2 | 12/2004 | Chidlovskii | |
| 6,892,189 B2 | 5/2005 | Quass et al. | |
| 6,981,040 B1 | 12/2005 | Konig et al. | |
| 7,024,405 B2 | 4/2006 | Salerno et al. | |
| 7,055,094 B2 | 5/2006 | Imielinski et al. | |
| 7,072,890 B2 | 7/2006 | Salerno et al. | |
| 7,139,688 B2 | 11/2006 | Aggarwal et al. | |
| 7,185,290 B2 | 2/2007 | Cadiz et al. | |
| 7,188,064 B2 | 3/2007 | Golden et al. | |
| 7,310,632 B2 | 12/2007 | Meek et al. | |
| 7,320,031 B2 | 1/2008 | Konig et al. | |
| 7,328,209 B2 | 2/2008 | Das et al. | |
| 7,328,401 B2 | 2/2008 | Obata et al. | |
| 7,337,170 B2 | 2/2008 | Lee et al. | |
| 7,349,826 B2 | 3/2008 | Subramanian et al. | |
| 7,363,308 B2 | 4/2008 | Dillon et al. | |
| 7,415,459 B2 | 8/2008 | Peltonen et al. | |
| 7,418,440 B2 | 8/2008 | Kubaitis | |
| 7,426,496 B2 | 9/2008 | Kristjansson | |
| 7,428,545 B2 | 9/2008 | Bala | |
| 7,433,876 B2 | 10/2008 | Spivack et al. | |
| 7,440,946 B2 | 10/2008 | Bloedorn | |
| 7,447,678 B2 | 11/2008 | Taylor et al. | |
| 7,454,393 B2 | 11/2008 | Horvitz et al. | |
| 7,457,809 B2 | 11/2008 | Bennetto et al. | |
| 7,516,125 B2 | 4/2009 | Rao et al. | |
| 7,702,508 B2 * | 4/2010 | Bennett | 704/257 |
| 7,941,438 B2 * | 5/2011 | Molina-Moreno et al. | 707/756 |
| 2004/0163043 A1 * | 8/2004 | Baudin et al. | 715/513 |
| 2005/0022115 A1 * | 1/2005 | Baumgartner et al. | 715/513 |
| 2005/0049852 A1 * | 3/2005 | Chao | 704/9 |
| 2005/0166152 A1 | 7/2005 | Hida et al. | |
| 2005/0187905 A1 * | 8/2005 | Dixon et al. | 707/3 |
| 2005/0235030 A1 | 10/2005 | Lauckhart et al. | |
| 2005/0246353 A1 | 11/2005 | Ezer et al. | |
| 2006/0041530 A1 | 2/2006 | Milic-Frayling et al. | |
| 2006/0047651 A1 | 3/2006 | Milic-Frayling et al. | |
| 2006/0059138 A1 | 3/2006 | Milic-Frayling et al. | |
| 2006/0155751 A1 | 7/2006 | Geshwind et al. | |
| 2006/0245641 A1 | 11/2006 | Viola et al. | |
| 2007/0005646 A1 | 1/2007 | Dumais et al. | |
| 2007/0112714 A1 * | 5/2007 | Fairweather | 706/46 |
| 2007/0214133 A1 | 9/2007 | Liberty et al. | |
| 2007/0250390 A1 | 10/2007 | Lee et al. | |
| 2008/0027913 A1 | 1/2008 | Chang et al. | |
| 2008/0066052 A1 | 3/2008 | Wolfram | |
| 2008/0114800 A1 | 5/2008 | Gazen et al. | |
| 2008/0154883 A1 | 6/2008 | Chowdhury et al. | |
| 2008/0208830 A1 | 8/2008 | Lauckhart et al. | |

OTHER PUBLICATIONS

Kushmerick et al., (2003) Adaptive Information Extraction: Core Technologies for Information Agents, Intelligent Information Agents, LNAI 2586, pp. 79-103.

Gupta, Ashish, et al., "Aggregate-Query Processing in Data Warehousing Environments", Proceedings of the 21st International Conference on Very Large Data Bases, Zurich, Switzerland, 1995, pp. 358-369.

Goldberg, David, et al., "Using Collaborative Filtering to Weave an Information Tapestry", Communications of the ACM, vol. 35, No. 12, Dec. 1992, pp. 61-70.

Ganti, V., et al., "Mining Very Large Databases", IEEE Computer Society, Long Beach, CA, US, vol. 32, No. 8, Aug. 1999, pp. 38-45.

Collins, Michael, "Discriminative Training Methods for Hidden Markov Models: Theory and Experiments With Perceptron Algorithms", Proceedings of Empirical Methods in Natural Language Processing (EMNLP), 2002, 8 pages.

Taskar, Ben, et al., "Max-Margin Parsing", In Proceedings of the Conference on Empirical Methods in Natural Language Processing, 2004, 8 pages.

* cited by examiner

METHODS AND SYSTEMS TO TRAIN MODELS TO EXTRACT AND INTEGRATE INFORMATION FROM DATA SOURCES

CROSS REFERENCE TO RELATED APPLICATIONS

This patent application claims the benefit of U.S. Provisional Application Ser. No. 61/121,013, filed Dec. 9, 2008, and U.S. Provisional Application Ser. No. 61/150,003, titled, "Methods and Systems to Train Models to Extract and Integrate Information from Data Sources" filed Feb. 4, 2009, which are incorporated herein by reference in their entireties.

TECHNICAL FIELD

Disclosed herein are methods and systems to acquire and integrate information from data sources, which may include one or more of databases, spreadsheets, web service feeds, and external websites. Also disclosed herein are methods and systems to model and manage acquired information.

BACKGROUND

Information can be acquired and integrated from many data sources. It is often useful to acquire and integrate information from data sources not in the direct control of the integrator. Where direct access to a data source is not possible, or where access to one or more data sources provides only a partial view of information associated with a given subject area or domain, conventional information integration approaches may be impractical.

Many websites and other non-database sources publish information that is generated from a database that lies behind the presentation or publication of the information on the site. Information published on a webpage or in some other unstructured format may be less useful than data in a database, as it may not be readily queried by end-users, and must be accepted in the published format or found through unstructured searching techniques. Furthermore, information on various subjects or domains may be distributed piecemeal across multiple different websites and other information sources, so that uniform access to related information for a given domain may be difficult or impractical to obtain.

Various software tools and techniques exist to acquire or scrape information from websites and similar sources of unstructured information, using methods analogous to screen-scraping techniques historically used for enterprise system integration. Such techniques may require considerable manual labor, which may include custom programming for individual sources to be scraped. Such tools may be incapable of integrating scraped information into a comprehensive, consistently structured database without considerable effort.

Applications that make use of information acquired from data sources may perform repeated acquisition runs over time as information is periodically or continually updated on each source. Managing data acquired over time, especially when the data is acquired from multiple sources, can be a difficult challenge. For example, when data is edited after acquisition and subsequently reacquired, the subsequently reacquired data may be inconsistent with the edited data. When data referring to the same entity is acquired from multiple sources, inconsistencies between the sources may lead to inconsistencies in the database.

SUMMARY

Disclosed herein are methods and systems to acquire and integrate information from data sources, which may include one or more of databases, spreadsheets, web service feeds, and external websites. Also disclosed herein are methods and systems to model and manage acquired information.

Information acquisition may include domain modeling. Domain modeling may be partially or completely automatic, or machine-implemented, such as when data comes from a structured source such as a database or a consistently formatted document, such as an extensible markup language (XML) document. When data comes from unstructured sources such as websites, domain modeling may include user supervision or input.

Domain modeling may include defining data elements, entities, and relations associated with a subject domain, along with arcs, types and cardinality constraints, to form a schema. Depending on cardinality constraints, certain arcs may be used as disambiguators to determine whether nodes with otherwise similar content are to be considered the same or different. Domain models may be defined in advance of data acquisition and/or may be incrementally or substantially extended as new sources are added or as new application requirements are adopted.

For a given domain, a variety of individual information and data sources that contain information relevant to the schema can be identified. For each such source, a human operator may train a system by pointing out data elements in the source that match corresponding data elements in the schema. The system may induce a domain grammar appropriate to the schema and the source layout and, using a model such as a Hidden Markov Model (HMM) corresponding to the domain grammar, may learn where in various sources these elements can be found. Since data organization can vary from source to source, or even in different areas of a single source, and since the representation of data from a source does not necessarily follow a standard normalized form, the system can transform its schema to match a page grammar of the source. By following an inverse transformation sequence, data that is parsed from a source in accordance with a corresponding page grammar can be automatically transformed back to the domain grammar structure, matching the data schema defined through domain modeling.

After this site training phase, the system can be set to acquire information from data sources substantially without user intervention. Newly acquired information may be merged with existing domain information that may have been uploaded, manually entered, previously acquired from the same source, or previously acquired from other sources.

A data model may be based on a graph representation. Using a graph similarity approach, data structures acquired through data-scraping or data-upload can be compared to existing graph structures in the database, and automatic merging may be employed.

A multi-layered graph model may be implemented to preserve original data structures as acquired from one or more sources, and to maintain one or more alias layers to represent any edits or merging actions. Such a multi-layered graph model may permit reacquisition of data without loss of edits or merging actions, and consistent application of edits across data acquired from multiple sources.

Once a sufficient quantity of data is acquired, the resulting aggregation of data, possibly from a plurality of sources, can be republished, distributed, used as part of a web service data feed or for a mash-up application, and can also be browsed, queried, and analyzed for a wide variety of private, enterprise, and public applications.

BRIEF DESCRIPTION OF THE DRAWINGS/FIGURES

Figure 1:
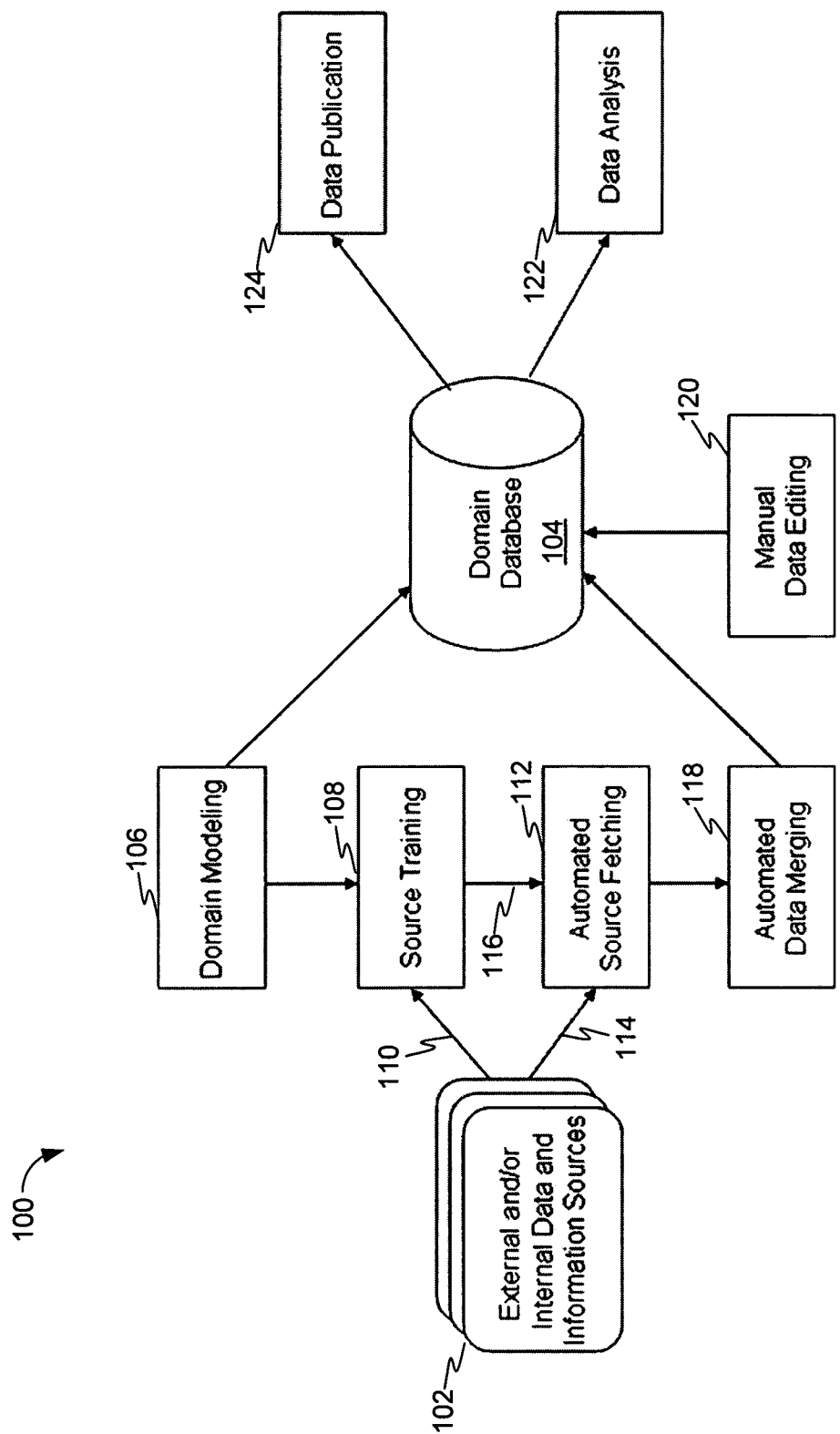
FIG. 1 is a graphic illustration of exemplary system components and tasks.

In the drawings, the leftmost digit(s) of a reference number may identify the drawing in which the reference number first appears.

DETAILED DESCRIPTION

1. Exemplary Data Elements and System Tasks

FIG. 1 is a graphic illustration of an environment 100, including exemplary methods and systems to model and acquire information from one or more data sources 102, and to integrate and manage the acquired information in one or more domain databases 104. One or more features disclosed herein may be implemented alone and/or in combination with one another.

2. Domain and Data Modeling

Domain database 104 may be configured as a graph database and the domain model may define properties of graph nodes and relationships or arcs between the nodes.

A data source 102 may include one or more of an internal data source and an external data source. A data source 102 may correspond to a network accessible data source, which may include one or more of a website accessible through the Internet and a web service feed provided over the Internet.

A data source 102 may comprise one or more of: computer files containing data in a format such as HTML, PDF, Word, XML, RDF, JSON, CSV, spreadsheet or text; inputs and outputs of network data services such as HTTP, REST and WSDL; and inputs and outputs of database query languages such as SQL and SPARQL.

A domain model may be identified, defined, and/or configured at 106. A domain model may include a set of entity types having corresponding properties, and relationships between the entity types. The entity types may correspond to nodes of a graph, and relationships between the entity types may correspond to arcs between the nodes.

A node may be associated with one of a plurality of node types, and each node type may be associated with a corresponding set of one or more rules or constraints, examples of which are described below.

A node type may determine a type of information with which the node is associated, which may include, for example, an integer, a name or a date. Each node type may represent or correspond to one type of information.

A node type may determine which named arc or arcs may emanate from the node.

A node type may determine a node type to which an arc may connect.

A node type may determine whether an arc may have one or multiple target nodes. For example, a person type node may represent an individual and may be permitted to have one social security arc that connects to one social security number type node. The person type node may, however, be permitted to have multiple child arcs that connect to multiple corresponding person type nodes.

A node type may determine whether a value associated with an arc may be used to disambiguate the node. Exemplary disambiguation features are disclosed further below.

Each arc of a node type may identify or be associated with a corresponding inverse arc having corresponding inverse arc name, multiplicity, and disambiguation properties.

A domain model may pre-exist, may be pre-configured, and/or may be configured and/or reconfigured dynamically or incrementally as information is acquired from one or more information sources 102 over time.

Domain modeling may be performed within a computer system substantially without user intervention, such as where information from an information source 102 is relatively structured.

Domain modeling may be performed within a computer system in response to user input, such as where information from a data source 102 is relatively unstructured.

Domain modeling may be analogous to defining a schema of a relational database, and may include adapting an existing database schema, which may be performed within a computer system substantially without user intervention.

Domain modeling may include displaying user-selectable domain modeling features and configuring a domain model in response to corresponding user input.

Configuration parameters of a domain model may be stored in domain database 104.

At 108, a system, such as an appropriately programmed computer system, may be trained to identify information 110 from data sources 102, corresponding to the domain model.

A plurality of data sources 102 may be associated with a domain model, and the training may include training a plurality of models within a system, each with respect to a corresponding one of the plurality of data sources 102, to recognize information from the data source 102 in accordance with the corresponding to the domain model.

At 112, the system or models may be invoked to acquire information 114 from one or more data sources 102 based on a combination of one or more domain models and source training data 116.

Acquisition of information 114 may include one or more of extracting information and uploading information. Information extraction may include data-scraping, and may include web-scraping.

At 118, acquired information 114 may be structured or reformatted and stored in domain database 104 in accordance with the domain model. This may include merging information 114 from multiple data sources 102, and/or merging information 114 received from a data source 102 on multiple occasions. Merging may include identifying unique entities, identifying and discarding redundant information, and integrating new information with existing information.

At 120, information within database 104 may be edited, which may include one or more of changing, adding, deleting, and merging data objects and relationship information. Editing at 120 may be performed in response to user input.

Information within database 104 may be used in one or more of a variety of ways. For example, and without limitation, information within database 104 may be computer processed or analyzed at 122, and/or output or published to one or more other systems at 124, such as over a network. One or more of analyzing at 122 and publishing at 124 may include providing one or more of data feeds and query feeds to one or more other systems.

Figure 2:
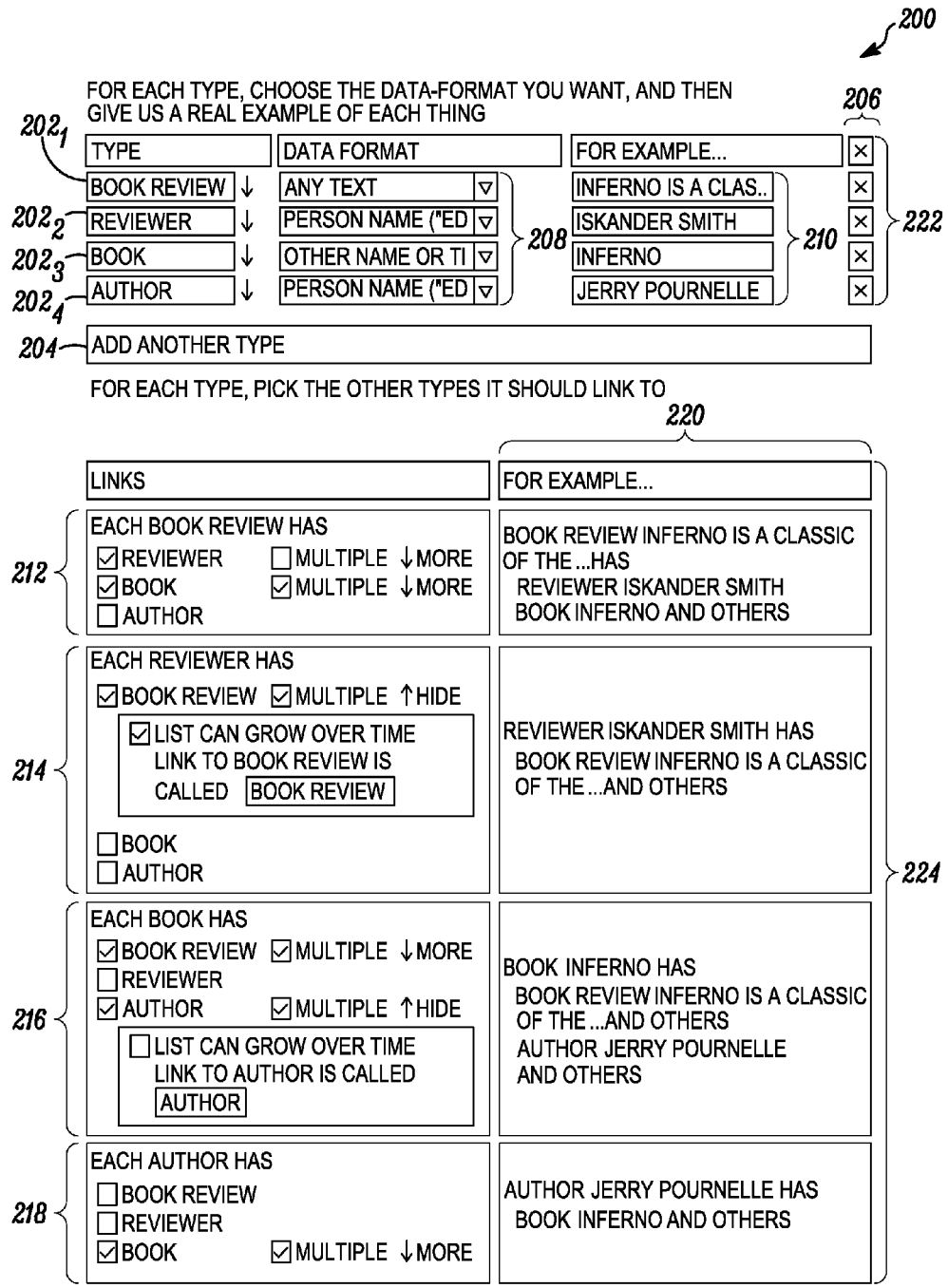
FIG. 2 is a graphic illustration of an exemplary graphical user interface.

FIG. 2 is a graphic illustration of an exemplary graphical user interface (GUI) 200, to permit a user to define data elements or nodes of a domain model and to configure relationship or arc parameters amongst the data elements.

In the example of FIG. 2, GUI 200 includes one or more entity type fields 202, to define entity types, illustrated here as book review $202_1$, reviewer type $202_2$, book $202_3$, and author $202_4$. Additional entity type fields may be added at 204. One or more entity types or fields 202 may be deselected or deleted at corresponding delete icons 206.

GUI 200 may include one or more data format fields 208, each corresponding to an entity type field 202, to permit a user to associate a data format with an entity type. A data format field 208 may include a menu of user-selectable data formats.

GUI 200 may include one or more property definition fields to permit a user to define relationships or permissible arcs between entity types identified in entity type fields 202.

In the example of FIG. 2, relationships or arcs between a book review entity type and other entity types may be configured at 212. As illustrated here, a book review type entity may be associated with one reviewer type entity, and multiple book type entities. A book review type entity is not permitted to be associated with an author type entity.

Relationships or arcs between a reviewer entity type and other entity types may be configured at 214. As illustrated here, a reviewer entity type may be associated with multiple book review type entities, which list is permitted to expand over time, such as to accommodate new reviews of a book. A reviewer entity type is not permitted to be associated with a book type entity or an author type entity.

Relationships or arcs between a book entity type and other entity types may be configured at 216. As illustrated here, a book entity type may be associated with multiple book review type entities, and multiple author type entities, which list is not permitted to grow over time. A book entity type is not permitted to be associated with a reviewer type entity.

Because the list of authors is not permitted to grow over time, that list of authors may be considered as a disambiguator and may be used to distinguish two books that share the same title. By contrast, the list of book reviews is permitted to grow over time, so that list is not used to disambiguate two books that share the same title.

Relationships or arcs between an author entity type and other entity types may be configured at 218. As illustrated here, an author entity type may be associated with multiple book type entities. An author entity type is not permitted to be associated with a book review type entity or a reviewer type entity.

A domain model schema may be configured with additional complexity, and may be revised over time, such as to extend a corresponding domain.

GUI 200 may include descriptive fields 220 to display user-readable indications or descriptions of relations between a corresponding entity type and other entity types. GUI 200 may be configured to dynamically revise or update descriptive fields 220 as relations are defined and redefined at one or more of 212 through 218.

GUI 200 may include one or more example value fields 210, each corresponding to an entity type field 202, to permit a user to enter corresponding example values to be inserted into corresponding descriptive fields 220.

Dynamically updated descriptive fields 220 and example value fields 210 may be useful, for example, for otherwise abstract and potentially complex assignment of bidirectional cardinality relations. For example, a domain model may include entities of type 1 that are always associated with a single instance of an entity of type 2, and entities of type 2 that may be associated with multiple instances of type 1 entities. Dynamically updated descriptive fields 220 and example value fields 210 may provide useful information and insight to users.

3. Source Training

Referring back to FIG. 1, source training at 108 may include one or more of tagging, grammar induction, and learning.

Figure 3:
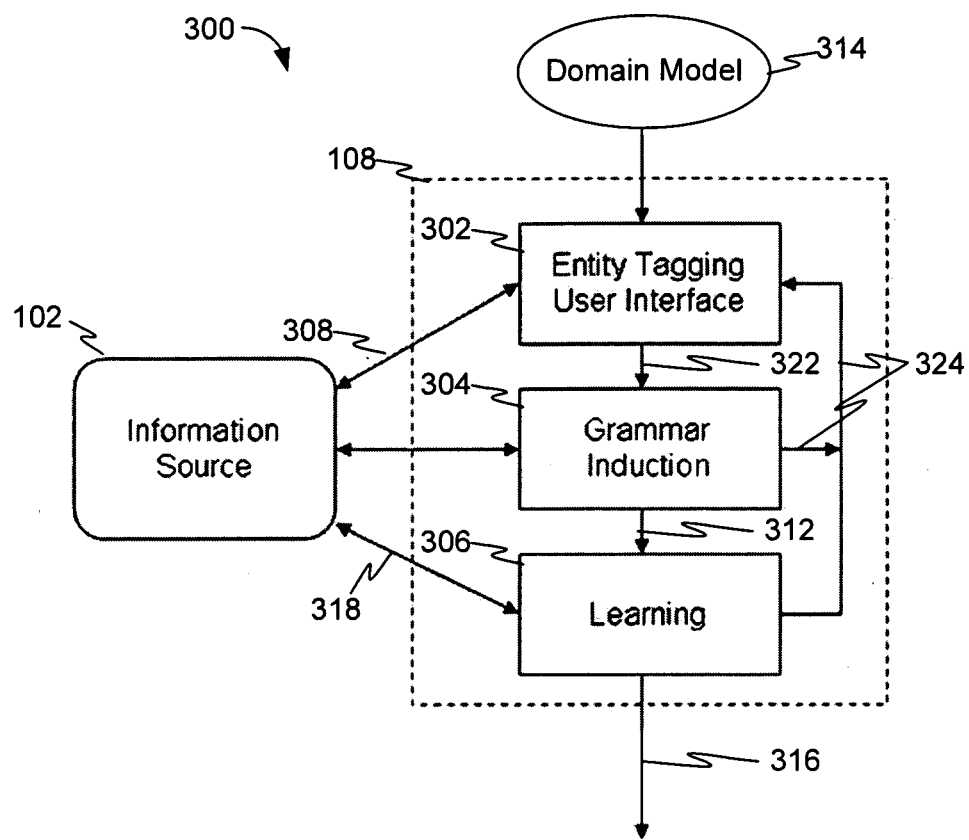
FIG. 3 is a graphic illustration of exemplary site training environment, including exemplary methods and systems to tag, induce grammar, and learn.

FIG. 3 is a graphic illustration of exemplary source training environment 300, including exemplary methods and systems to tag, induce grammar, and learn. The methods and systems of FIG. 3 are described below with respect to a web site based information source 102. The example of FIG. 3 is not, however, limited to training with respect to web sites.

At 302, one or more source documents or web pages 308 are tagged. Tagging at 302 may include displaying a GUI, which may include rendering the one or more source documents 308 to be trained for acquisition, in a taggable form, and rendering of user-selectable tags corresponding to one or more entity types of a domain model 314, and arc paths of domain model 314.

Figure 4:
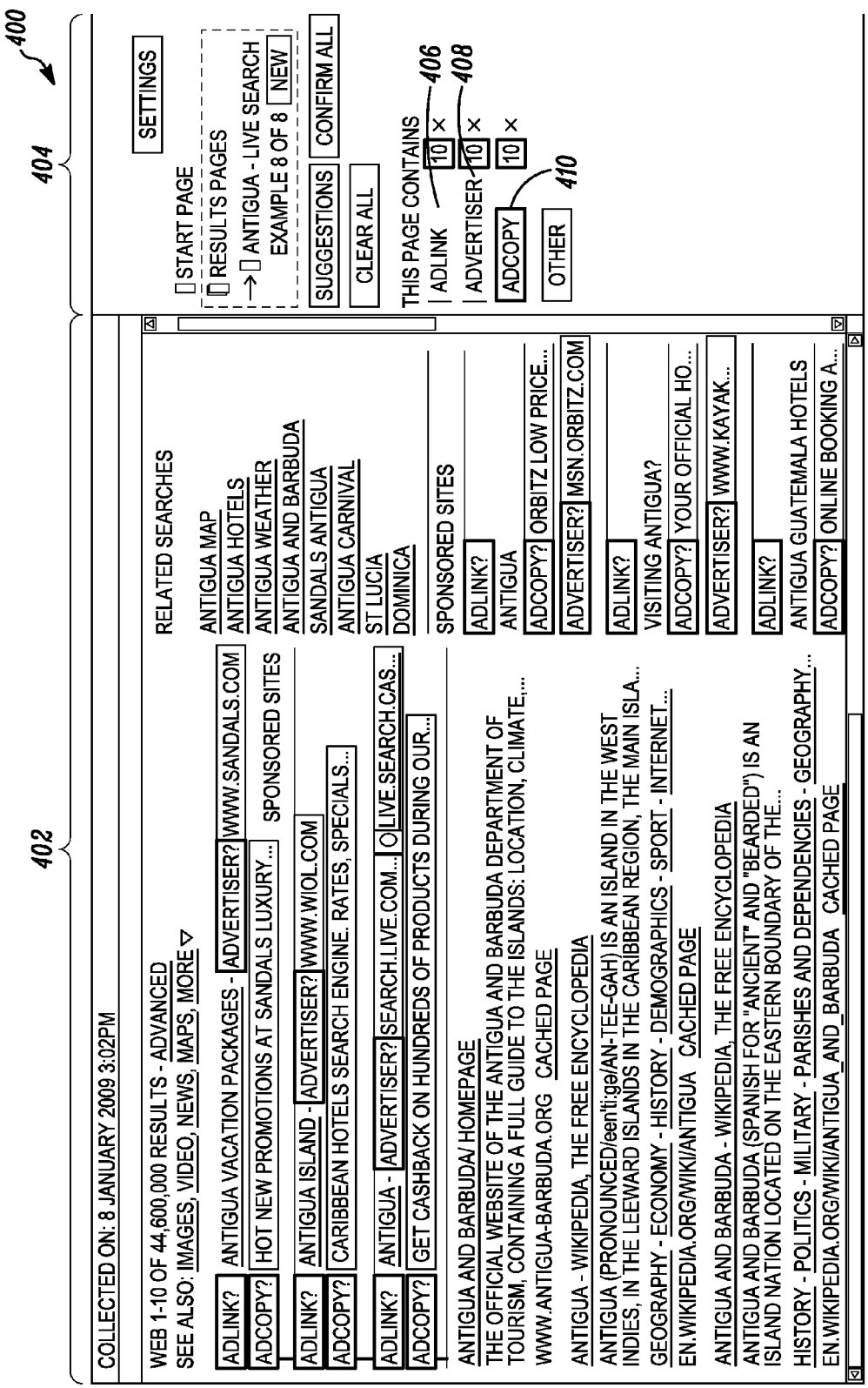
FIG. 4 is a graphic illustration of another exemplary graphical user interface.

FIG. 4 is a graphic illustration of an exemplary GUI 400, including an exemplary source document 402 and an exemplary tag control panel 404. In the example of FIG. 4, tag control panel 404 includes an adlink tag icon 406, an advertiser tag icon 408, and an adcopy tag icon 410.

GUI 400 may be configured to receive indications of user-selected tag icons and corresponding user-identified tokens of source document 402. Tokens are described further below. GUI 400 may be configured to highlight the user-identified tokens of source document 402 and to insert indications of corresponding user-selected tags proximate to the highlighted user-selected tokens.

Referring back to FIG. 3, tagging at 302 provides tag data 322, which may include user-selected tags and corresponding user-identified tokens of the one or more source documents 308, in accordance with domain model 314.

At 304, a page grammar 312 may be determined or induced from domain model 314 and a tag layout of the one or more tagged or partially tagged source documents 308. Page grammar 312 may be derived by heuristic search over a set of invertible grammar transformation operators. Because the operators are invertible there is a sequence of inverse transformations which will yield the domain grammar from any given page grammar. Each such transformation can carry actual web-scraped data along with it. Later on, when data is automatically acquired from the corresponding website, the acquired data will satisfy the derived page grammar, and then, undergoing the appropriate inverted transformation sequence, will be conformed to the domain grammar associated with domain model 314. By combining multiple inverse grammar transformation sequences across multiple data sources, a uniform view of data that is consistent with domain model 314 can be enforced.

At 306, page grammar 312 may be provided to a learning component, which may include a Hidden Markov Model (HMM) learning component. Given page grammar 312 as input, the HMM learning component can construct a HMM that is structurally related to the one or more tagged source documents 308. Using a Perceptron algorithm with a set of textual features analyzed from the one or more tagged source documents 308, which may include a HTML representation of the one or more source documents 308, the HMM learning component iteratively assigns and modifies internal model weights to develop a pattern-matching mechanism to extract data corresponding to page grammar 312. Subsequently, when confronted by a web page consistent with page grammar 312, the HMM can extract data that matches page grammar 312. Using the inverse grammar transform sequence described above, the data can then be related to domain model 314, and stored in domain database 104 of FIG. 1.

At 316, the learning component may output a combination of the HMM and page grammar 312 that can later be used for automated data acquisition.

Tagging, grammar induction, and HMM development can result in various errors. Most often these are related to tagging errors, or to unexpected layouts on parts of the data source not yet analyzed. Entity tagging at 302 may include iterative refinement and/or error reporting at 324. Each iteration or refinement may result in grammar modifications and consequent HMM changes. After each tagging round resulting in a HMM change, the system may attempt to apply the HMM to the current source document, and to any other similar source documents previously parsed according to the same page grammar. When all such samples from the data source can be parsed and the corresponding data acquired to an acceptable level, the HMM may be determined to be trained with respect to the information source 102.

4. Tagging

Source training documents, or portions thereof, may be tagged in response to user input. In response to the tagging, a system may construct an automated agent to traverse an information source 102 to extract its structured data into database 104 with a given schema. For example, tagging a few pages of a website may allow the system to construct a web-scraping agent that traverses the entire website, or a portion thereof, to acquire and restructure its data.

A document may include data available from a data source 102, and may comprise, without limitation, computer files containing data in a format such as HTML, PDF, Word, XML, RDF, JSON, CSV, spreadsheet or text; inputs and outputs of network data services such as HTTP, REST and WSDL; and inputs and outputs of database query languages such as SQL and SPARQL. Methods and systems disclosed herein may be implemented with respect to one or more such formats. For exemplary purposes, and without limitation, examples are provided herein with respect to web pages.

The smallest region of a page that can be independently tagged is referred to herein as a token, which may correspond to one or more of a word, a number, a punctuation character, an HTML element, a link or hyperlink, a form button, a control character, including not printing control characters, an image, audio, and video. A tag may span a single token or an extended region comprising several words or paragraphs of text, or even multiple full HTML layouts such as tables. Tags may include, without limitation, data tags and navigation tags.

Data tags may be applied to tokens or token sequences that represent entities in a domain model in the context of a given data source. Data tags can be defined as arc-paths through the domain schema, starting from a given root type. A root type can be chosen arbitrarily from amongst the various entity types defined in the domain model, wherein a given root type can apply throughout a domain, or for each individual bucket. In these examples the "." operator indicates arc traversal. For example, if "Person" is the root type, then tags may include, for example, "Person", "Person.SSN", "Person.Child", and "Person.Child.Child.SSN". For relatively simple tree-shaped schemas, it is equivalent to associate one data tag per entity type in the schema.

Navigation tags may include one or more of a Next-Page tag, a Details-Link tag, and a Submit-Form tag. Next-Page tags may be applied to links or buttons on a document or page which, when followed, may lead to additional pages of the same or similar format as the current page.

Details-Link tags may be applied to links or buttons on a page, which may lead to pages in a new format.

Submit-Form tags specify how the agent will populate form elements such as text input fields, radio buttons, checkboxes, and drop-down menus. Configurable properties of the tag specify what combinations of values will be entered into the form fields when the automated agent runs. Configurable properties may include one or more of:

The human operator specifies a constant value or set of values for each form field, and directs the agent to use the combination consisting of the full cross-product of all the values.

The human operator specifies a list of combinations of values (a subset of the full cross-product) for the agent to use.

The human operator specifies a database query which the agent will use, at run-time, to produce a list of combinations of values to enter into the form.

The human operator does not specify the values to use, but rather indicates that the values should be entered later, at the time the agent runs (so-called parameterized live queries).

The application of Next-Page, Details-Link and Submit-Form tags to links and buttons in a website may produce a tree of web pages. Each page in a tree may be manually or automatically assigned to a bucket of similarly formatted pages. For example, buckets may be assigned automatically as follows: an initial page is placed in bucket number 0, and all further pages are placed in the bucket number corresponding to the number of Details-Link or Submit-Form elements that have been followed on the path to that page. Next-Page links do not advance the bucket number.

For websites and information sources where the type of page returned by following a navigational element varies dynamically, the agent may use a classifier to automatically determine which bucket each page belongs to. This approach allows the system to handle, for example, a hotel chain website that, when you follow the link corresponding to a city name, takes you directly to the hotel property's detail page if the chosen city has only one hotel, but takes you to a summary list of properties if the chosen city has multiple hotels. To establish training data for such a classifier, bucket identities can be assigned manually during the hand-tagging process, or can be inferred during that stage by an unsupervised clustering algorithm based on features of the page. Features relevant to determining a page's bucket may include a set of DOM paths contained in the page, statistics about the text contained under each DOM path (average length, percentage of document), and slash-delimited substrings of the page's URL. A classification algorithm such as a decision tree, perceptron, or support vector machine, may be trained to predict the bucket identity from the page features.

Tagging may result in multiple buckets, each containing one or more pages to which data tags and navigation tags have been applied. From these buckets of hand-tagged pages, a web agent may be inferred to traverse the website or web service, without user intervention, to generalize patterns of manually applied navigational tags to determine which links to follow and how to submit forms, and to generalize patterns of manually applied data tags to determine which data fields to extract. Extracted data elements may be normalized and connected with named arcs in accordance with the target data schema, or domain grammar.

5. Invertible Grammar Induction

For each set or bucket of hand-tagged pages, one or more statistical machine learning techniques may be used to train an extractor to take new pages of the same or similar format, extract the structured data contained within, and translate that data into the form of the target schema.

Data acquisition may include inducing a page grammar corresponding to a pattern of tag sequences associated with the pages of the bucket, so as to constrain an extraction process.

Data acquisition may include training a system to identify regions or tokens of similarly formatted untagged pages to be tagged in accordance with the hand-tagged pages.

Data acquisition may include restructuring, or ontology matching connections among extracted data elements, so as to make the extracted data structurally compatible with the domain schema.

Methods and systems to induce a page grammar and to restructure extracted data, referred to herein as invertible grammar induction, are disclosed below.

Methods and system to train a system to identify tokens of untagged documents or pages, including Hidden Markov Models (HMMs), are disclosed further below.

Exemplary methods and systems are described below with respect to one or more examples. The methods and systems are not, however, limited to the examples herein.

Example 1 is directed to populating a target database of Events having a schema that allows each instance of an Event to occur on only a single Date. Hand-tagged pages of a website may be in the form of Event, Date, Date, Date, Event, Date, Date.

A page grammar of the hand-tagged pages may be inferred in the form of (Event, Date+)+, where "+" indicates that repetition is allowed.

Information extracted from similarly formatted web pages in accordance with the page grammar may be transformed to the domain grammar of the schema by cloning the first Event into three Events and cloning the second Event into two Events, each of which occurs on a single Date.

Figure 5:
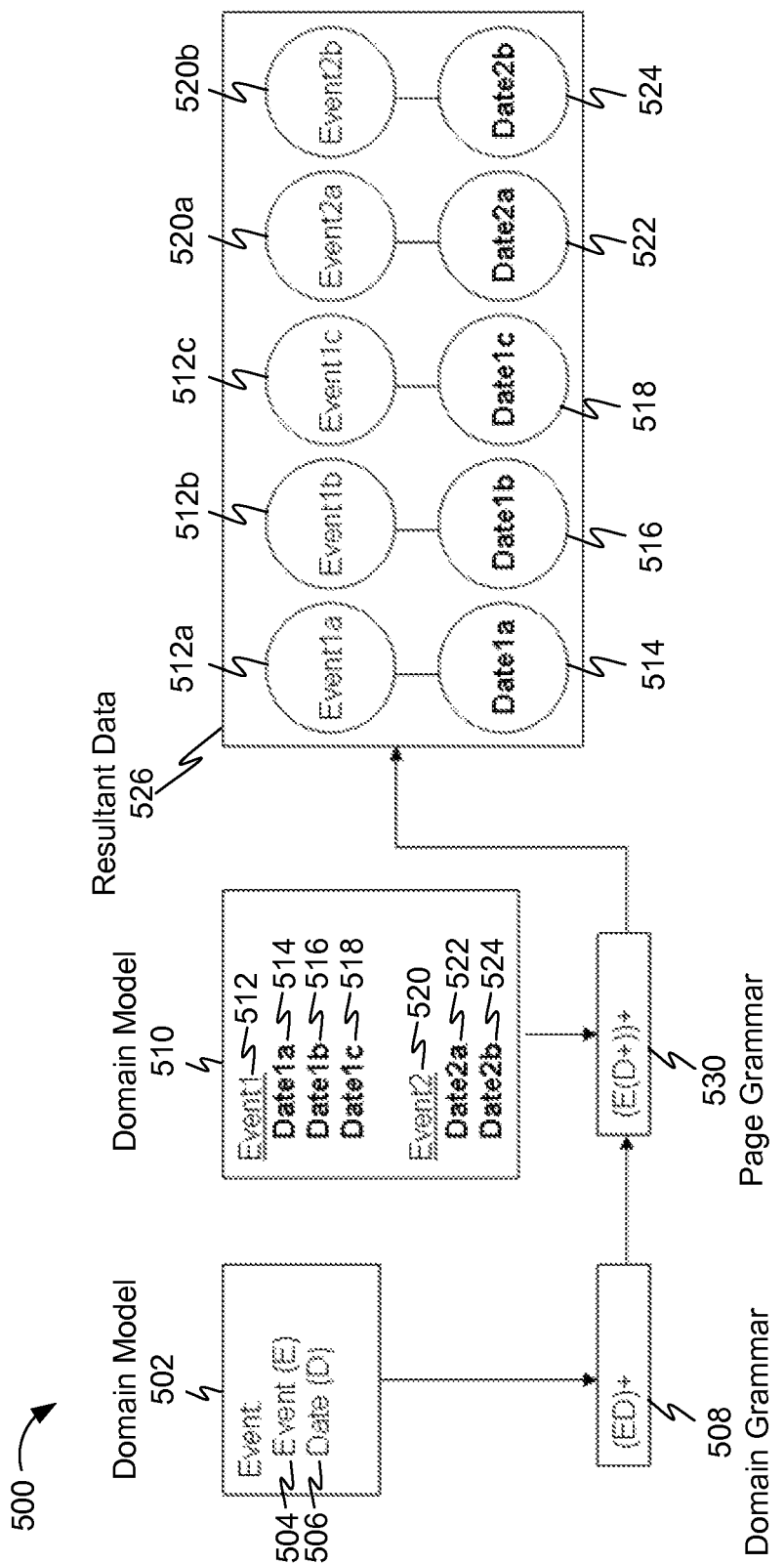
FIG. 5 is an exemplary illustration of grammar induction system components and tasks.

FIG. 5 is a graphic illustration of an exemplary environment 500, including exemplary methods and systems to implement a domain model, such as described above with respect to Example 1.

Environment 500 includes an exemplary domain model 502, including event types Event(E) 504 and Date(D) 506, in which an Event(E) 504 is associated with a single Date(D) 506, which may be represented as Event(E).Date(D). This may correspond to Example 1 above.

A domain grammar 508 may be derived from domain model 402, to define domain model 402 as (ED)+.

A hand-tagged source document 510, which may represent a web page, includes first and second events 512 and 520, respectively, each associated with multiple dates, which is inconsistent with the cardinality restriction of domain model 502. In the example of FIG. 5, first event 512 is associated with dates 514, 516, and 518, and second event 520 is associated with dates 522 and 524.

A page grammar 530 may be derived from a combination of document grammar 508 and analysis of hand-tagged source document 510, according to invertible grammar transformations.

Resultant data 526 includes a single date for each event. In the example of FIG. 5, resulting data 526 includes multiple instances 512a, 512b, and 512c of first event 512, each associated with a corresponding one of dates 514, 516, and 518. Resulting data 526 includes multiple instances 520a and 520b of second event 520, each associated with a corresponding one of dates 522 and 524.

Example 2 is directed to populating an employee database, including an Employee entity type, each of which may relate to a Photo and an Email Address. Hand-tagged pages of a website may be missing some Photos and Email Addresses, and the corresponding tags may have the form of: Employee.Photo, Employee, Employee.Photo, Employee, Employee.Email, Employee.Photo, Employee, Employee.Email, Employee, Employee.Email . . . .

A page grammar may be inferred of the form (Photo? Employee Email?)+, where "?" indicates that a tag is optional.

The grouping associated with the page grammar may be used to associate each Employee with its preceding Photo and subsequent Email in the database.

Example 3 is directed to populating a database of Book Reviews, each of which links to one or more Book Reviewers and one Book, each of which in turn has one or more Authors.

A first information source website may have data in the form of: Review, Review.Reviewer, Review.Book, Review.Book.Author, and Review.Book.Author. The corresponding page grammar matches the domain grammar of the target database schema, so no transformation is needed.

Another information source website may organize data by book with multiple reviews per book, as follows: Review.Book, Review.Book.Author, Review.Book.Author, Review, Review.Reviewer, Review, Review.Reviewer, Review, Review.Reviewer. From this tagging pattern, a page grammar may be inferred of the form (Book Author+(Review Reviewer)+), to automatically distribute Book1 and Author1 to all three of the Reviews.

Induced grammars may include finite-state grammars, which can be variously represented as regular expressions, trees, Markov models, or sets of production rules. For purposes of this explanation the latter representation is used in examples below. In a production rule system, each rule $\{L \rightarrow R[1] \ldots R[n]\}$ has a left-hand-side comprising a single non-terminal symbol, and a right-hand-side comprising an ordered sequence of other non-terminal symbols and/or terminal symbols, which may represent document tags. The grammars may also have one or more of the following properties:

Each terminal or non-terminal on the right-hand-side may be annotated with a minimum and maximum cardinality. Without loss of generality, minimum cardinality may be restricted to $\{0,1\}$ and maximum cardinality to $\{1,\infty\}$.

The special symbol "start" is a non-terminal, which can appear only on the left-hand-side of rules.

The same non-terminal symbol may appear on the left hand side of multiple rules, indicating a nondeterministic choice.

The directed graph of non-terminal symbols, defined by drawing directed arcs from each left-hand-side non-terminal to its corresponding right-hand-side non-terminals, is acyclic.

A grammar thus defined, compactly specifies a (possibly infinite) set of tag sequences. A grammar may be inferred that is compatible with the hand-labeled tag sequences, and structurally mappable to the target domain schema. Exemplary methods and systems to induce an invertible grammar are described below.

Given a domain schema and a bucket of hand-tagged pages, a domain grammar may be established for the bucket, which may include converting the domain schema itself into a grammar. As described above, data tags may be defined as arc-paths through the schema starting from a root type. Navigation tags may be heuristically assigned temporary arc-paths in the schema, as siblings of the data tag that they most commonly neighbor in the tagged pages, or as children of the root type if there are no data tags in the bucket.

Working with this set of arc-paths, the domain schema may be recursively expanded into production rules, starting with the rule {"start"→(root type)+}. Each type referenced on the right-hand-side of a rule engenders a new rule, whose right-hand-side type concatenates a terminal symbol (if the arc-path to that type was a tag) with new non-terminals corresponding to each of the outgoing arcs allowed by that type's schema definition. Arc-paths not associated with the tags present in the bucket may be omitted. Rule expansion may end when all the bucket's tags have been reached. The domain grammar thus generated imposes particular ordering and grouping constraints on the bucket's tag sequences. The domain grammar may not necessarily result in a successful parse of the sequences, but may serve as the starting point for an induction search.

To find a grammar that parses the tag sequences, a heuristic search procedure, such as best-first search, may be applied. Search operators may include one or more of the following grammar transformation operators: LIFT, PERMUTE, MULTI-CHOICE-PERMUTE, FACTOR, REQUIRE, UNLOOP, SET-CARDINALITY, CHOICE, and INTERLEAVE, which are described below. Applying an operator generates a set of new candidate grammars, along with a heuristic cost (a number≥0) for each. The search may identify a lowest-cost sequence of operators that transforms the domain grammar into a page grammar that parses the tag sequences.

The search operators may be invertible, and each inverse operator may include instructions to not only undo the change to the grammar, but also to restructure any data that fits the pattern of the new grammar into the pattern of the previous grammar. Thus, as a byproduct of the search for a grammar that describes the tagged pages, a sequence of grammar transforms may be produced which, when replayed in reverse, describes how to transform the data extracted from such pages into the structure of the domain grammar corresponding to the target domain schema. This simultaneously provides grammar induction and ontology matching, or determining a correspondence between one structuring of data, that of the web page, and another, that of the target schema.

Invertible grammar transformation is not limited to web-scraping or HTML, and may be implemented with respect to a variety of situations to import one document's structured data into another target schema. Whenever two data sources contain the same data elements but structure or format them differently (e.g., sources of concert information may be organized hierarchically by date, venue, or performer; or be flat), invertible grammar transformation may be implemented to generate a transformation mapping from one to the other.

6. Grammar Transformation Operators

Exemplary grammar operators are disclosed below. Each operator may be parameterized according to whether it may be applied to each production rule in a system (P), to each element appearing on the right-hand-side of a rule (R), or to an entire grammar globally (G). In the examples below, "?" denotes an optional element, "+" denotes an element that may repeat one or more times, and "*" denotes an element that may repeat zero or more times.

LIFT(R): given a right-hand-side element R in a rule, assuming that R appears exactly once as the left-hand-side of another rule: this operator first reduces the maximum cardinality of R in the first rule to 1 (if necessary), then replaces R by the right-hand-side of the second rule. For example, given {X→A*BR*C, R→DEF}, LIFT(R) would replace the first rule by {X→A*BDEFC}. This operation serves to give following PERMUTE operations flexibility to intermingle R's siblings (e.g. A, B and C) with R's children (D, E, and F).

PERMUTE(P): given a production rule {L→R[1] . . . R[n]}, this operator reorders the n right-hand-side elements, producing a new rule {L→R[P[1]] . . . R[P[N]]} where P[i] is a permutation on 1 . . . n. For example, {X→ABC} could be permuted to {X→BCA}. Heuristics are used to choose candidate permutations that plausibly match the input tag sequences and document layouts, so not all permutations need to be searched.

MULTI-CHOICE-PERMUTE(P): given a rule P, this operator produces multiple rules of the same form produced by PERMUTE(P), thereby allowing multiple alternative orderings all to be parseable by the grammar.

FACTOR(P): given a production rule {L→R[1] . . . R[n]} with n≥2, this operator extracts a proper subsequence of the right-hand-side elements, creates a new left-hand-side element M that expands into that subsequence, and replaces the extracted subsequence in L with M+ (allowing one or more repetitions of that subsequence). For example, if {X→ABCD}, then one possible factorization would replace that rule with the two new rules {X→AY+D, Y→BC}. Heuristics may be used to choose factorizations that plausibly match the input tag sequences and document layouts, so not all factorizations need to be searched. Note that the inverse of this operator, when applied to extracted data, links the non-repeated elements to each of the repeated elements, which may require cloning to satisfy cardinality constraints (see FIG. 5).

REQUIRE(R): the minimum cardinality of a right-hand-side element may be toggled between 0 and 1.

UNLOOP(R): the maximum cardinality of a right-hand-side element may be toggled between infinity and 1.

SET-CARDINALITY(G): a dynamic programming algorithm may be used to set the cardinality restrictions on all grammar elements simultaneously, in polynomial time, without having to search the exponential space of REQUIRE(R) and UNLOOP(R) over all elements R. The algorithm may first represent the grammar G as a Markov Model, modified so as to allow every element to be skipped (corresponding to minimum cardinality 0), or to be infinitely repeated (corresponding to maximum cardinality of infinity). Penalty costs may be assigned to the model's skip-transitions and repeat-transitions. All other transitions may be assigned a cost 0. A Viterbi algorithm may then be run on each page's tag sequence to determine the lowest-cost path through the model, i.e., the path that uses the fewest skip-transitions and repeat-transitions. Elements whose skip-transitions were unused by the Viterbi parses may be marked as required (minimum cardinality=1) in the grammar, and similarly, elements whose repeat-transitions were unused by the Viterbi parses may be marked as non-repeating (maximum cardinality=1).

CHOICE(P): to represent that two elements (say, B and C) never co-occur, a rule like {X→AB?C?} may be transformed into the rules {X→AM, M→B, M→C}. More generally, any subsequence of optional elements on the right-hand-side of a rule may be extracted and replaced by a new nonterminal M. The extracted elements are then partitioned into two or more non-overlapping subsets, which in turn become the right-hand-sides of new rules for the new nonterminal M.

INTERLEAVE(R): a repeated right-hand-side element R+ can be separated into two neighboring elements. For example, the rule {X→AB+C} could become {X→ABB+C}. This permits enforcing cardinality limits more complex than the {0,1,∞} limits allowed by the base model. Moreover, in combination with PERMUTE, it allows grammars like {X→ABCB}, so pages where multiple instances of tag B are interleaved with tag C can be parsed.

7. HMM Learning

A conditional Hidden Markov Model (HMM) may be constructed with topology to enforce constraints of the induced grammar. For any input page, every path through this model produces a tagging of the page consistent with the grammar, and a score. A Perceptron training algorithm may be applied to adjust the weights of the scoring function so that the highest-scoring path for each hand-tagged page corresponds to the path that reproduces the tags applied by hand. Then, given a new page, the Viterbi algorithm may be applied to find the highest-scoring path through the model. Decoding this path produces a graph of data, in the structure of the induced grammar. The reversed sequence of inverse grammar operators may be applied, as described above, to convert the graph of data into the structural form of the target domain schema. The result may include a relatively small graph of data for every page collected during the traversal of the website or data source. The graphs may later be heuristically attached together based on the hyperlinks interconnecting their source pages, normalized, and merged into a database.

Exemplary methods and systems to train and run extractors to glean structured data from individual pages of data are disclosed below.

(a) HMM Topology

A Hidden Markov Model may include a graph of named states connected by directed transitions. States may include a start state and an end state. Each state of the model analyzes the page at the current token pointer location and produces a real-valued score. Each transition from one state to another also contributes a score. The scores may not necessarily have or need a probabilistic interpretation, and need not be nonnegative or to sum to unity. Each state may either emit a tag, which labels the current token by that tag and advances the pointer location by one token, or be silent, which does not advance the pointer location. If a document contains D tokens, then a parse of that document by the Hidden Markov Model is a path through the graph which starts at the start state, traverses the graph by following any number of silent states and exactly D emitting states, and finishes at the end state. The sum of the scores accumulated along that path is the total score of that parse.

The states and transitions of the model may be constructed so that the sequence of emitted tags obeys the constraints of a given grammar. HMM construction works by building a small HMM for each grammar rule, and assembling those hierarchically into a larger composite HMM. "Junk" HMM states may be interleaved between the sub-HMMs during assembly, to allow for processing of the document's untagged tokens.

Following this process, the composite HMM corresponding to the grammar's start non-terminal is a HMM to parse pages in the bucket.

(b) HMM Features

Each state of the HMM may compute a real-valued score as a function of the current document pointer location. Each state may specify a set of binary features to compute given the pointer location. These features may include features of the particular token at the pointer location, and may include features forward or backward through the document. The presence of a feature on a state may have an associated real-valued weight, which may be summed to produce the score. Exemplary methods and systems to determine weights are disclosed below.

Exemplary classes of features are now described.

VOCAB: is the current document token a particular word (e.g., "Baltimore")? Each emitting state may have one such feature for each of the N most commonly appearing words in the bucket's pages.

REGEX: does the current document token match a particular regular expression (e.g., is it a number, is it the name of a month, is it exactly 6 characters long, is it a capitalized word, is it an HTML image tag)?

BEGINS_REGEX: does the document, starting at the current token and extending forward, match a particular regular expression?

ENDS_REGEX: does the document, ending at the current token and extending backward, match a particular regular expression?

BEGINS_DATABASE: does the document, starting at the current token and extending forward, match a value that already exists in a particular field of the database?

ENDS_DATABASE: does the document, ending at the current token and extending backward, match a value that already exists in a particular field of the database?

HTML_ENCLOSURE: is the current document token enclosed by a particular HTML tag or style? For example, is the current token in boldface or in the 3rd column of a table? Similar to the VOCAB features, features for the most common enclosing tags are defined on each emitting state.

FULL_DOM_PATH: does the HTML or XML DOM path of the current document token match a specified pattern, e.g., HTML/BODY/TABLE[3]/TR[≥2]/TD[5] ("in the body of the page, in the third table, in the second or greater row of that table, in the fifth column")?

PREFIX: does the document, for the K tokens preceding the current token, exactly match a given sequence of tokens?

SUFFIX: as PREFIX above, but for the K tokens following the current token.

(c) Using the HMM For Information Extraction

Given the HMM topology, features, weights on features and transitions as defined above, and a document of D tokens in length, each path through the HMM from the start state to the end state that traverses D emitting states represents a grammatical parse of the document. A Viterbi algorithm may be utilized to compute the highest-scoring such path.

The Viterbi algorithm may include or generate a best-predecessor chart to record, for each state S and token location T, a preceding state S' in the highest-scoring partial path that traverses from the start state to S while emitting tokens 1 . . . T. The chart may be populated in polynomial time using standard dynamic-programming techniques. The chart may be stored in a table of dimensions N*D, where N is the number of states in the HMM and D is the document length in tokens. The optimal parse is then revealed by following the chain of best-predecessors backwards from the end state at final token D.

The chart may be stored in a table of dimensions N*D, where N is the number of states in the HMM and D is the document length in tokens.

Alternatively, the chart may be run-length encoded along the 1 . . . D axis, so that for each state S, the best-predecessor[S] is stored as a run-length-encoded list of length D. This may reduce the space requirement of storing the best-predecessor chart, and may be useful, for example, where a relatively large number of state transitions on the highest-scoring partial paths are self-loop transitions, which leave the state unchanged while advancing through the document. For variant models where self-loops may not dominate the parse paths, other forms of list compression may be implemented to reduce the memory requirements of Viterbi.

(d) HMM Training

Machine-learning technique of the Collins Perceptron algorithm may be applied (see, "Discriminative Training Methods for Hidden Markov Models", Collins 2002), with structured margin bonuses (see, Max-margin parsing, Taskar et al. 2004), both of which are incorporated herein by reference in their entireties, to set the weights of the model from the hand-tagged pages. In the forced alignment phase of Perceptron training, tagged tokens may be forced to align with a matching tag state in the HMM, and untagged tokens may be forced to align with a junk state, resulting in the highest-scoring correct parse. Forced alignments may be implemented by setting the score of any partial path that violates the alignment to $-\infty$.

In the unforced phase, Viterbi may be run unconstrained by the hand tags. When the unconstrained parse differs from the forced correct parse, the weights associated with features of the forced correct parse may be incremented and the weights associated with features of the incorrect parse may be decremented. This procedure may be repeated until the unconstrained parses are correct, or until a time limit is reached.

Once a model is trained, a challenge may arise when the set of training documents is edited, such as when tags are added to or removed from a page, or a new hand-tagged page is added to the training set. In such a situation, the training process may be repeated based on substantially all of the tagged documents.

Alternatively, for faster performance, such as in situations where real-time response to the human operator is required, an incremental training procedure may be applied. If the modifications to the hand-tagged document set are compatible with the previously induced grammar, then additional rounds of perceptron training may be applied directly to the previously trained HMM. If, on the other hand, the tagging modifications cause a document to be incompatible with the previous grammar, a new grammar may be induced and a corresponding new HMM topology may be constructed. When a given feature exists in the context of a given tag's state in both the old model and the new model, that feature's weight in the new model can be initialized to its weight in the old model, before commencing perceptron training. These procedures may provide training a head start and speed convergence.

(e) Within-Page Suggestion

Training may be applied within a single, partially hand-tagged page, to automatically apply tags to the remainder of the same page. This is referred to herein as within-page suggestion, or suggestion.

Suggestion may include running the Viterbi algorithm in a semi-forced mode, where not all the untagged tokens are forced to align with junk states. For example, an approach may be to only force tagged tokens to align with appropriate tag states, and to leave untagged tokens unconstrained. To prevent spurious suggestions of a tag T from being suggested in between the hand-applied occurrences of tag T, untagged tokens may be forbidden from aligning with tag states whose tag has been applied to a later token in the page. The forbidding may include setting the score of any partial path that uses the forbidden tag/state alignment to $-\infty$.

Suggestion may be applied in one or more situations. For example, suggestion may be applied when a partially-tagged page is not the first page in the bucket, there is already a trained model for the existing hand-tagged pages, and the tags applied thus far to the page are compatible with the existing grammar. In such a situation, incremental training may be run on the existing HMM, followed by Viterbi as described above, to determine an alignment for the untagged portion of the page.

Suggestion may be applied when the partially-tagged page is the first page in the bucket, or when its tagging pattern is incompatible with the existing grammar. In such a situation, a new grammar may be induced from the partial tag sequence, HMM weights may be trained using the Perceptron algorithm with the semi-forced Viterbi procedure, and the parse corresponding to the final alignment reached by the training may be reported.

(f) Hotspots

Perceptron training may fail to converge for one or more reasons, such as inconsistencies in the hand-tagging. It may be useful to automatically identify the plausible locations or hotspots of such inconsistencies so they can be reviewed and, if necessary, corrected. Disclosed herein are methods and systems to identify such hotspots, including to tally which tokens are most frequently incorrect during the unforced phase of perceptron training.

For each such error during each iteration of training, the token and the tag which the system expected to find in place of the hand tag that had actually been applied, is recorded. Any token that was incorrect on a relatively substantial fraction, such as, for example 30% or greater, of training iterations may be flagged or identified as a hotspot, and the expected tag may be proposed to the human operator as an alternate choice for hand-tagging of that token.

(g) Pre-Fetch of Atypical Pages

When the user has hand-tagged only a small subset of pages, generalization to a much larger set of pages may fail if the larger set of pages includes examples whose formatting or content deviates relatively significantly from patterns included in the smaller set. If such examples are identified early during the initial tagging process and presented to the user for hand-tagging proactively, generalization failures may be avoided.

A relatively large number of untagged pages may be pre-fetched for a current bucket, and a currently trained model may be applied to parse the pre-fetched pages, which may be scanned for deviant parses.

Scanning for deviant parses may include computing statistics of the Viterbi score on each page, such as a per-token score at each state, and/or per-token overall score, and determining whether scores fall outside a normal range of such statistics as defined by the hand-tagged pages.

Scanning for deviant parses may include computing statistics of the actual extracted regions of data for each tag (number of tokens; percentage of punctuation characters, HTML tags, numbers and words), and determining whether the statistics fall outside a normal range of such statistics as defined by both the hand-tagged pages and the existing database contents for that tag's data type.

For example, for each bucket B, a typicality(P) metric may be computed to measure how typical a page's parse P is relative to a set of known correct parses and extracted data. The typicality metric may be defined by inferring a multidimensional probability distribution over the parse statistics and outputting the probability P under that distribution. Alternatively, or additionally, nonparametric statistics may be used. A binary function, Atypical(P), may be defined as Typicality(P)<H. The threshold H may be set so as to make Atypical(P) hold true for a relatively large percentage, such as 95% for example, of the known correctly parsed pages Q.

Pages may then be prioritized for hand-tagging in order of how atypical their parses are relative to the pattern understood thus far.

(h) Site Change Detection

A source website may undergo a change, which may reduce an effectiveness of a trained extraction model for that website. Site changes may be detected by applying a check for Atypical parses, such as described above. If a relatively significant fraction, such as at least 25% of the pages extracted from a website are determined to be Atypical, the corresponding batch of data may be withheld from merging into the database, and the source may be identified as being in likely need of additional hand-tagging and training.

(i) Cross-Source Generalization

Training may begin afresh for each new source added to a domain. For domains with relatively large numbers of similar sources (e.g., Bed & Breakfasts, restaurants, high schools), machine learning may be leveraged so that new sources require little or no training at all.

Leveraging may include identifying a source when its parse statistics are in typical of a known model. For example, for sources in the domain that have already been trained, a second HMM may be trained each of the sources. Each second HMM may share the same grammar and topology as the original HMM, but the weights for at least a portion of layout-specific features (e.g., HTML_ENCLOSURE, FULL_DOM_PATH, PREFIX, SUFFIX), may be left untrained. Training thus focuses on the content, not the layout of the tagged pages. Such HMMs are referred to herein as content HMMs.

When starting to tag a new bucket of pages on a new source, the original HMMs and/or the content HMMs corresponding to the same bucket number in all or a user-selected subset of previously trained sources, may be run on the new pages. The typicality metric may be computed over a sample set of the new pages. If the Viterbi scores and extracted-data statistics of all the new pages are within the normal range of those statistics on its originally trained bucket of pages, the model may be used to initialize the parser for the new bucket.

Depending on the application, the transferred parser can be used to initialize suggestions in the new bucket, which may be subject to user confirmation. Alternatively, data from the new source may be incorporated without user confirmation. The latter approach may be useful, for example, where multiple sources of data are formatted substantially similar to one another, such as where multiple sources of data are generated by the same rendering system or structured format (e.g. RSS feeds).

(j) Site-Change Auto Repair

A variant of the Cross-Source Generalization technique may also be applied to automatically update the training model of a single source whose page layout or rendering style has changed (identified as in section h above). Such a source's pages may be deemed Atypical by the original HMM, but still Typical by the Content HMM, which is less sensitive to style changes. In that case, the Content HMM's parse may be preferred and used as the basis for either a fully automatic or a computer-suggested manual retagging of the source's pages.

8. Data Management: Merging and Editing

Methods and systems to manage data collected over time from multiple sources are disclosed below, including methods and systems to automatically merge data under control of a system, such as an appropriately programmed computer system, to edit and merge data in response to user input, and to preserve original data.

(a) Merging

When data has been parsed from a data source and transformed to match a domain schema, the data may be integrated into a database that includes previously gathered data. Newly obtained data may include one or more of redundant data, new data, and a combination of redundant data and new data. Redundant data may be encountered when data is repeatedly retrieved from a data source. A combination of redundant data and new data may include data that overlaps existing data, such as data that describes some entities that are already represented in the database, such as new relationship information related to an existing entity. Methods and systems are disclosed herein to selectively determine whether overlapping information is to be added or merged with existing information, under control of a system. The determining may include identifying objects in multiple graphs to be treated as a common object, based on user-specified rules associated with a schema.

(b) Mergeability

Objects may be determined to be mergeable when they are of a same user-defined type. For example, a node of type Person and a node of type Birthdate may be determined to be non-mergeable.

Objects may be determined to be mergeable when they have the same or similar labels. Each node can have a label associated with it, which may correspond to text extracted by a parser. For example, two nodes of type Person may be labeled "John Smith" and "Bill Murphy," respectively, and the two nodes may be determined to be different based on dissimilar labels. Canonicalization rules may be added to one or more types to allow similar labels to be treated as equivalent for purposes of merging. For example, canonicalization rules may be added to treat the parsed text "John Smith" and "Smith, John" as equivalent for purposes of merging.

Objects may be determined to be mergeable when they are in agreement with respect to values of corresponding disambiguating arcs or properties. For example, person nodes may each be permitted to have a single birth date property. Thus, two person nodes that are both labeled "John Smith," but with different birth date properties may be determined to be non-mergeable. Disambiguators and agreement are described below.

(c) Disambiguators

A property for which a user has not specified that a list can grow over time may be used as a disambiguator.

Properties with a maximum cardinality of 1 can be used as disambiguators. For example, in the exemplary domain of books, authors, and reviews, described above, reviews are not disambiguators because a list of reviews associated with a book is permitted to grow over time. Authors may be used as disambiguators because a list of authors associated with a book is not permitted to grow over time.

When property values associated with multiple nodes may be combined into a common node without violating corresponding disambiguation rules, the disambiguator rules are in agreement. For example, two nodes may have the same ordered set of property values for a property, or one or both nodes may have no values for the property. A node may have no values for the property when, for example, a corresponding source does not provide values for the property.

A domain model may possess a cycle of disambiguator properties. Methods and systems to represent data are disclosed herein to accommodate such situations.

(d) Ambiguity

Where an incoming node is compatible with more than one node in a data base, the incoming node may be referred to as an ambiguous node. An ambiguous incoming node may occur when the schema and the data do not include or provide sufficient information to select one of the compatible nodes with which to merge the incoming node.

One or more of techniques may be employed to avoid ambiguous nodes. For example, a configurable approach may be applied across a domain, user input may be solicited to resolve individual occurrences, one or more heuristics may be applied, and/or one or more domain-specific disambiguation rules may be applied.

Where insufficient information is available to decide which of several nodes to merge a new node with, a determination may be made to not merge the new node with an existing node, and to add the new node to the database as a new object. The new node may be annotated with possible merge choices, which may be utilized in a subsequent disambiguation procedure.

(e) Exemplary Merges

Figure 6:
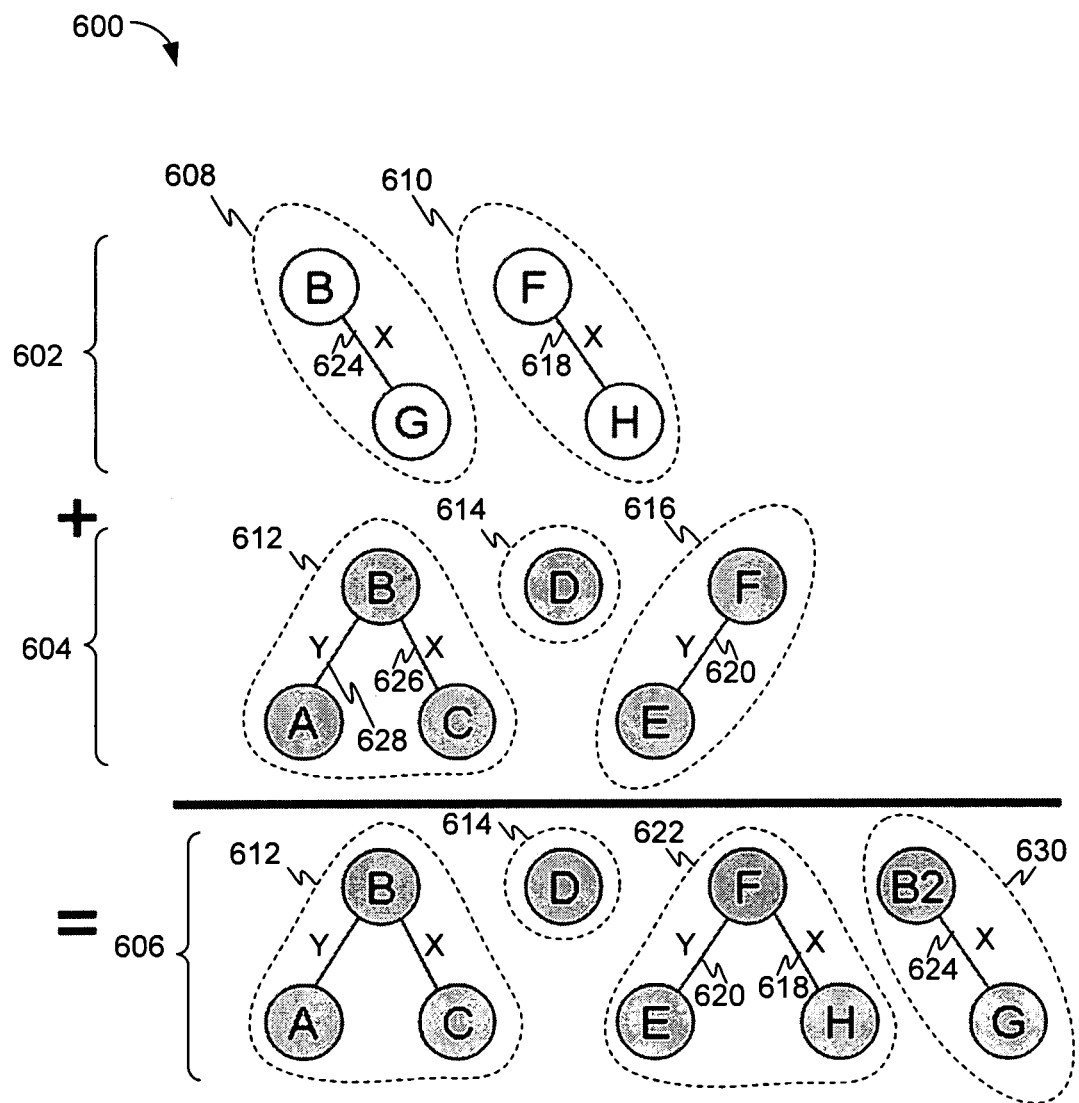
FIG. 6 is a graphic illustration of an exemplary merge environment.

FIG. 6 illustrates an exemplary merge environment 600, wherein newly acquired data 602 is merged with existing data 604 to obtain merge data 606. Merge environment 600 may be implemented with respect to domain database 104 in FIG. 1.

In the example of FIG. 6, newly acquired data 602 includes data graphs 608 and 610. Existing data 604 includes data graphs 612, 614, and 616. Data graphs 608, 610, 612, 614, and 616 each include one or more named nodes A, B, C, D, D, F, G, and H. Nodes B, D, and F may represent a first entity type, nodes C, G, and H may represent a second entity type, and nodes A and E may represent a third entity type. For example, and without limitation, the first entity type may be person entity types, and nodes B, D, and F may represent named persons. The second entity type may be birth date entity types, and nodes C, G, and H may represent dates. The third entity type may child entity types, and nodes A and E may represent named children.

A named entity of a one type may be related to one or more named entities of one or more other types, which may be illustrated with corresponding arc types. In the example of FIG. 6, two exemplary arc types, X and Y, are illustrated.

Relations between named entities may be restricted by cardinality rules associated with the arc types. For example, arc types X may specify that a person type node may be related to no more than one birth date node, referred to herein as a cardinality of one. Arc types Y may specify that a person type node may be related to multiple child type nodes, and may further specify that the number of related child type nodes is permitted to grow, referred to herein as a cardinality of multiple, permitted to grow.

In the example of FIG. 6, new graph 610 and existing graph 616 each include a node F.

In new graph 610, node F is related to second type entity node H through X type arc 618. X type arc 618 may represent a relation between a person F and a corresponding birth date H.

In existing graph 616, node F is related to third type entity node E through Y type arc 620. Y type arc 620 may represent a relation between a person F and a child E.

In this example, the relation of node F to node H through X type arc 618 in graph 610 is not inconsistent with, and is thus in agreement with the existing relation of node F to node E through Y type arc 620 in graph 616. Accordingly, graph 610 may be merged with graph 616. A resultant merged graph 622 includes the original relation of node F to node E of existing graph 616, and the new relation of node F to node H of new graph 610. The inclusion of the relation of node F to node H in graph 622 represents additional knowledge about node F.

In the example of FIG. 6, new data 602 does not include information about node D in existing graph 614. Existing graph 614 may remain unchanged in resultant merged data 606.

In the example of FIG. 6, new graph 608 and existing graph 612 each include a node B. In new graph 608, node B is related to second type entity node G through X type arc 624. In existing graph 612, node B is related to third type entity node A through Y type arc 628. The relation of node B to node G through X type arc 624 in graph 608 is not inconsistent with the existing relation of node B to node A through Y type arc 628 in graph 612.

In existing graph 612, node B is also related to second type entity node C through A type arc 626. Where, as in this example, a named first type entity node is permitted to have only one relation to a second type entity node, the relation of node B to node G through X type arc 624 in graph 608 is inconsistent, or not in agreement with the existing relation of node B to node C through X type arc 626 in graph 612. This may represent a situation where two similarly named people, represented by respective nodes B in graphs 608 and 612, are associated with different birth dates.

New graph 608 may thus be determined to be non-mergeable with existing graph 612. Accordingly, existing graph 612 may remain unchanged in merged data 606, and a new graph 630 may be added to data 606, where node B of new graph 608 is illustrated as node B2.

(f) Preservation of Original Data and Multi-Layer Graph Representations

Domain database 104 in FIG. 1 may be configured to preserve original states of data objects subsequent to automated and/or user-initiated edits and merge operations. This may be useful for one or more purposes.

For example, and without limitation, data may be acquired from one or more information sources, integrated within a database, and subsequently edited. The original version of the data may subsequently be re-acquired from the one or more information sources and/or from other information sources. Preservation of the original state of the data may permit a determination that the re-acquired data is redundant to the previously acquired data, and may reduce and/or negate a need to integrate the re-acquired data with the original or edited data.

Figure 7:
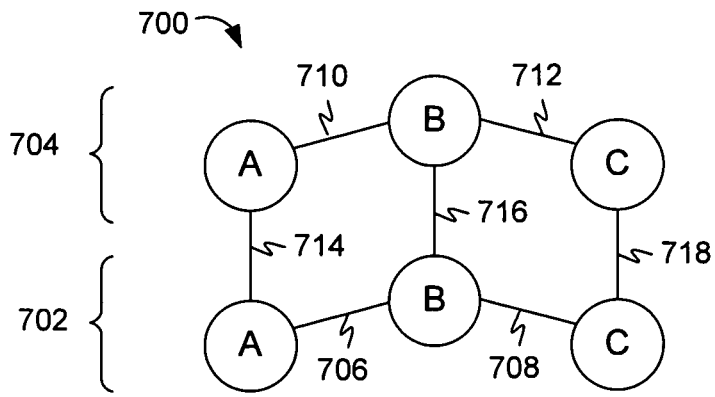
FIG. 7 is a graphic illustration of an exemplary multi-layer graph.

Data preservation may be implemented with a multi-layer graph. FIG. 7 is a graphic illustration of an exemplary multi-layer graph 700, including an original graph layer 702, and one or more alias layers, illustrated here as an alias graph layer 704.

In the example of FIG. 7, original graph layer 702 includes a plurality of nodes A, B, and C, and associated relation arcs 706 and 708. Nodes A, B, and C, may represent information obtained from a single data acquisition from a single data source, information obtained and merged from multiple acquisitions from a single data source, or information obtained and merged from multiple data sources.

Alias graph layer 704 includes a record or alias of nodes A, B, and C, and associated relation arcs 710 and 712. Nodes A, B, and C, of alias layer 704 may be, at least initially, redundant to original graph layer 702, and relation arcs 710 and 712 may, at least initially, have semantic values of relation arcs 706 and 708.

Node A, B, and C in alias graph layer 704 may be related to corresponding nodes A, B, and C, in original graph layer 702 through corresponding arcs 714, 716, and 718.

Edits, such as user-initiated edits may be performed with respect to alias layer 702, and original states of data objects may be preserved within original graph layer 702. Exemplary edit operations are described below with respect to FIGS. 8 and 9.

Figure 8:
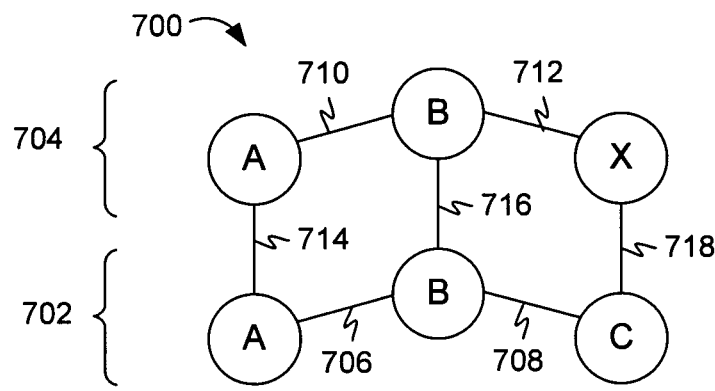
FIG. 8 is a graphic illustration of an exemplary edit operation performed with respect to the multi-layer graph of FIG. 7.

FIG. 8 illustrates multi-layer graph 700, wherein node C within alias graph layer 702 has been renamed node X. Such an edit may be made in response to user input. The original state of nodes A, B, and C, are preserved in original layer 702.

Figure 9:
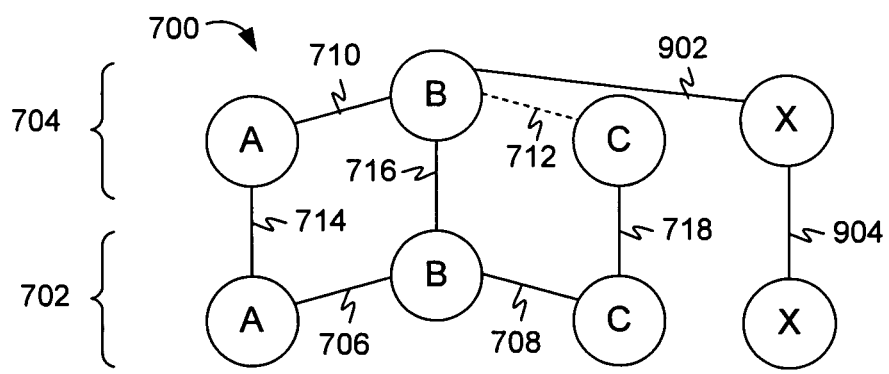
FIG. 9 is a graphic illustration of another exemplary edit operation performed with respect to the multi-layer graph of FIG. 7.

FIG. 9 illustrates multi-layer graph 700, wherein a new node X is added to alias layer 704. New node X is related to node B in alias layer 704 through an arc 902, and a pre-existing arc 712 from node B to node C is severed. The original state of nodes A, B, and C are preserved in original layer 702. Node X may also be created in original layer 702 and related to node X in alias layer 704 through an arc 904.

Exemplary user-initiated merge operations are described below with respect to FIGS. 10 and 11.

Figure 10:
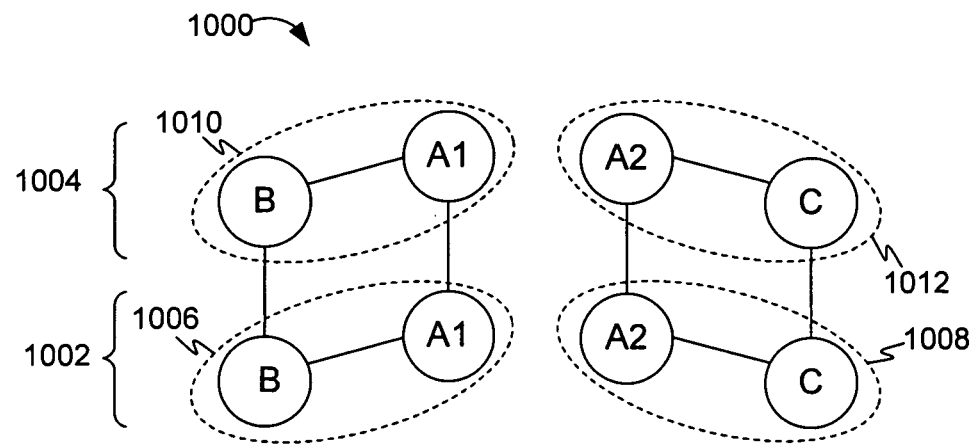
FIG. 10 is a graphic illustration of another exemplary multi-layer graph.

FIG. 10 is a graphic illustration of an exemplary multi-layer graph 1000, including an original graph layer 1002, and one or more alias graph layers, illustrated here as alias graph layer 1004. In the example of FIG. 10, original graph layer 1002 includes a sub-graph 1006 having nodes A1 and B, and a sub-graph 1008 having nodes A2 and C. Alias graph layer 1004 includes corresponding sub-graph 1010 and 1012.

Nodes A1 and A2 may initially be determined to represent different entities or features, which may result from spelling differences and/or other data inconsistency. Such an initial determination may be made under control of a system, such as an appropriately programmed computer system. The determination may preclude automatic merging of sub-graphs 1006 and 1008. Where nodes A1 and A2 are subsequently determined to represent the same entity or feature, which decision may be made by a user, sub-graphs 1010 and 1012 may be merged at alias graph level 1004.

Figure 11:
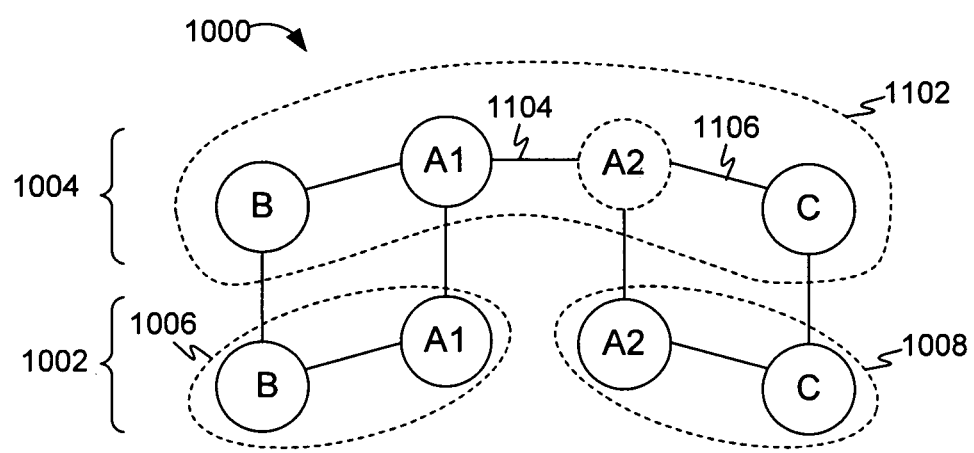
FIG. 11 is a graphic illustration of an exemplary merge operation performed with respect to the multi-layer graph of FIG. 10.

FIG. 11 is a graphic illustration of multi-layer graph 1000, wherein sub-graphs 1010 and 1012 of alias graph layer 1004 of FIG. 10 are effectively merged into a graph 1102, while original states of sub-graphs 1006 and 1008 are preserved in original graph layer 1002. The merging may be performed in response to user-input.

In the example of FIG. 11, node A1 is linked to node A2 in alias graph layer 1004 through an arc 1104, and node A2 of alias graph layer 1004 is hidden from user view such that node A1 appears in place of node A2. Node A1 in alias graph layer 1004 thus appears to be connected to node C through an arc 1106. Node A2 may be preserved within original graph layer 1002 to preclude re-introduction of sub-graph 1008 into the database during a subsequent data acquisition.

When data is acquired from an information source, which may include re-acquiring previously acquired information from the same information source, the data may be analyzed, such as for mergeability, with respect to an original graph layer, such as original graph layer 702 in FIGS. 7, 8, and 9, and original graph layer 1002 in FIGS. 10 and 11. Thus, when data is initially acquired from an information source and subsequently edited, and the data is thereafter re-acquired from the information source, the preservation of the initial data in the original graph layer may avoid re-introduction of the data into the database. Correspondingly, preservation of the edited data in an alias graph layer may preclude the edited data from being affected by the re-acquired initial data.

Queries, reports and other applications that make use of the graph database may be performed with respect to the alias layer. Original graph layer data may be hidden from user view for one or more purposes, and may be visible for one or more other purposes, such as one or more data merge actions associated with data reacquisition.

(g) Exemplary Methods of Merging

Automated, or system implemented merging, may be performed in one or more phases. For example, a first phase may include merging new data nodes with existing nodes in an original graph layer of a database, when the new data nodes and the corresponding existing nodes are acquired from the same information source. Where new nodes and their property values do not correspond to existing data obtained from the information source, a second phase may include examining an alias graph layer for suitable nodes for which to merge the new data.

Figure 12:
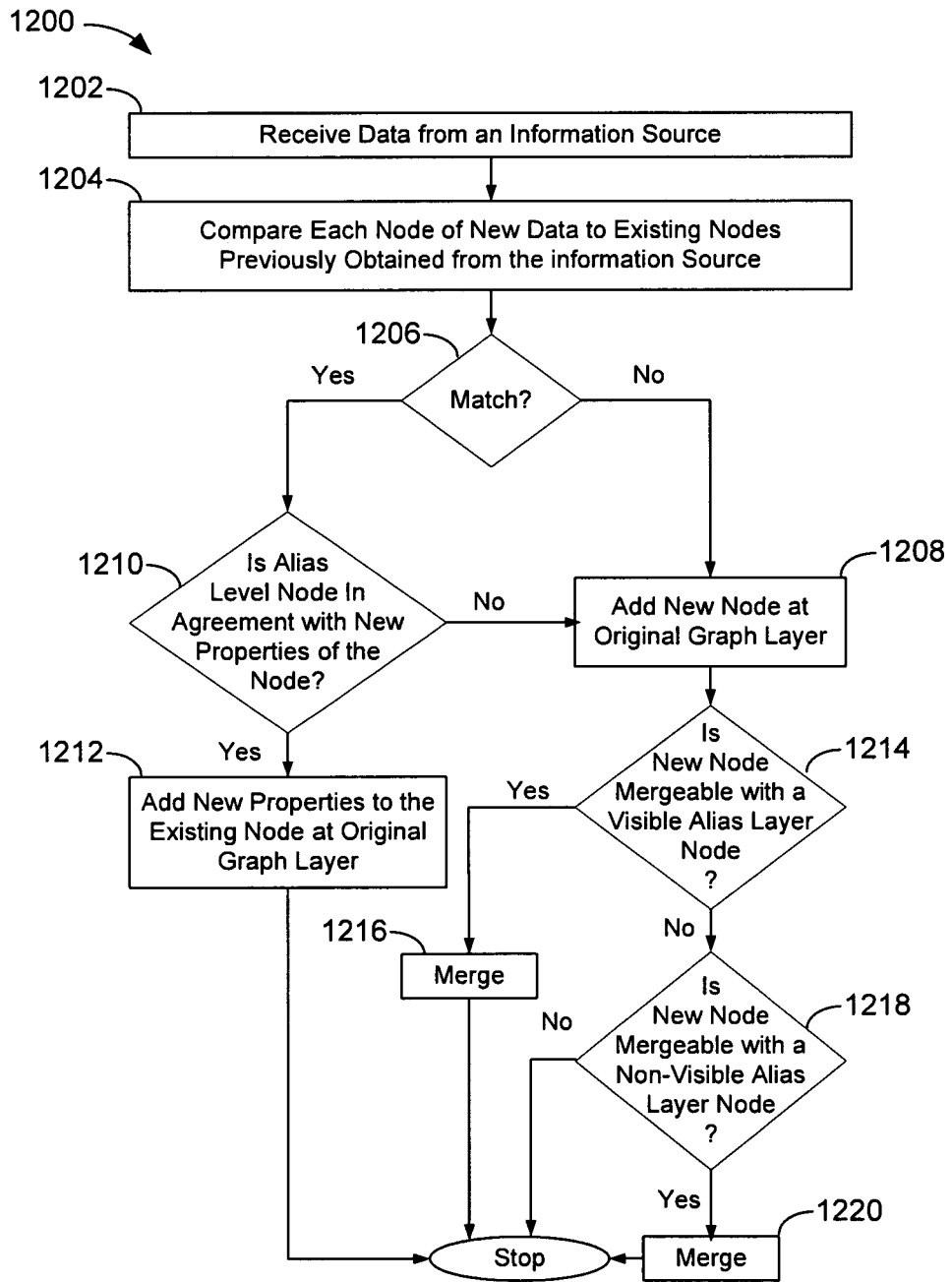
FIG. 12 is a process flowchart of an exemplary method of merging data.

FIG. 12 is a process flowchart of an exemplary method 1200 of merging data in a multi-layer graph database.

At 1202, data is received from an information source.

At 1204, the data is compared with existing nodes of a database that were previously obtained from the same information source. The comparison may be performed with respect to existing nodes at an original graph layer of the multi-layer graph database.

At 1206, when the data received at 1202 does not correspond to an existing node that was previously obtained from the information source, a new node may be added to the database at 1208 corresponding to the data received at 1202.

When the data received at 1202 corresponds to an existing node that was previously obtained from the information source, new properties associated within the data may be merged with the existing node at 1212. Since the new properties associated with node received at 1202 are added to, or integrated with the existing node at 1212, but the node itself is not added to the database at 1212, the merging at 1212 may be referred to as destructive merging.

Prior to the merging at 1212, a corresponding alias node may be examined at 1210. Where the alias node includes a disambiguation property value that does not agree with a new property value received at 1202, a new node may be added to the database at 1208 to accommodate the new property value. This may occur, for example, where the alias node has been modified, such as described above with respect to one or more of FIGS. 8 through 11, and where the modification has added or changed a property value associated with the alias node such that the new property value received at 1202 is inconsistent with, or non in agreement with, the property value of the alias node.

The merging of information obtained over time from an information source at 1212 may permit an original graph layer node to accumulate property values for non-disambiguating properties, and to accumulate property values for disambiguator properties where there are no existing property values. A preference of merging information obtained over time from an information source at 1212 may avoid potential ambiguity.

At 1214, a new node added at 1208 may be compared to visible nodes in an alias graph layer to determine whether it is mergeable with a visible node. When the new node added at 1208 is determined to be mergeable at 1214, the new node may be merged at 1216.

An example of the comparing at 1214 and the merging at 1216 is provided with respect to the example of FIG. 9 discussed above. Where the data received at 1202 includes a node A related to nodes B and X, at 1206 the data may not match original graph layer 702 in FIG. 9, and would thus be added as a new node or graph at 1208. At 1214, the data received at 1202 may match with alias layer 704 in FIG. 9, and thus may be merged with alias layer 704 at 1216. The new node A may be attached to the existing node A in alias graph layer 704. This may be referred to as non-destructive merging.

At 1218, where no matching existing node is found at 1206, and no matching visible node is found within an alias graph layer, or user-cleaned layer, at 1214, the new node may be compared at 1218 to hidden and edited nodes associated with other information sources.

Where a match is identified at 1218, the data obtained at 1202 may be merged with the matching node in the alias graph layer at 1220.

Method 1200, or portions thereof, may be implemented within a computer, such as described below with respect to FIG. 13.

(h) Metadata

Original graph layer nodes may be annotated with metadata, which may include one or more of an indication of an information source, an acquisition or scraping session, and an acquisition time. The metadata may include an indication of a website and/or other data source, and may include an indication of a page within the source from which a corresponding node and/or related nodes were parsed.

The metadata may permit tracking of changes to a node over time, and may permit a batch of associated data to be identified and discarded. For example, the metadata may be used to identify and remove a batch of information associated with a source and/or acquisition session or time. Where a subset of nodes and/or relationships within a batch has been reinforced from other batches and/or sources, the subset of nodes and/or relationships may be retained within the database.

(i) Data Management Operations

Exemplary data management actions are disclosed below. One or more of the exemplary data management actions may be implemented under control of a system, and/or in response to user-input.

Create node—create a new node pair in the graph (creates nodes at both the source and alias layer).

Trash—Flag a node as deleted, but do not remove from the graph. The effect of this is to hide an alias node as well as its subsumed source nodes from the regular view of data, but to still allow new, matching nodes to be automatically merged into this group, such that they are also hidden.

Purge—Actually remove a node permanently from the graph.

Purge batch—Remove all data from a scraped batch. This does not affect data from other batches even if it is merged with nodes in the deleted batch.

Merge—Logically merge two or more nodes, making one of them the alias node for the rest, but preserving the original graph structure below.

Unmerge—Undo a merge operation, by severing a node from its alias and unhiding it.

Edit-literal—Alter an entity internal label at the "alias" layer, preserving the original label at the "source" layer.

Add Property Value—Add an arc in the graph relating two entities at the "alias" layer.

Delete Property Value—Remove an arc from the graph two entities at the "alias" layer.

Reorder properties—All properties or arcs relating nodes are ordered. The order can be altered using this operator.

9. Exemplary Applications

Methods and systems disclosed herein may be implemented with respect to a variety of environments, including for example, content publishing and analysis.

Content publishing may include providing and/or permitting access to acquired data by one or more of users, customers, and subscribers of data and information services.

Content publishing may be provided with respect to one or more of web-page development, web service feeds and distributions, query-based network services, mash-ups that combine multiple web services into a common dashboard or composite application, data mash-ups that combine multiple databases and/or data domains into a common or compound data set, data distribution on physical media, and imports from and exports to other data sources and formats including desktop applications such as spreadsheets, and enterprise applications such as relational databases.

Analysis may include one or more of processing, analyzing, querying, browsing, navigating, and manipulating acquired data, such as in support of questions, answers, and reports. Analysis may be performed with respect to and/or on behalf of a person or entity that controls the data acquisition.

Analysis may include one or more of market and financial analysis, accounting applications, statistical analysis, demographic analysis, scientific analysis, and data monitoring applications.

One or more of content publishing and analysis may be performed by users, such as to access, query, browse, or otherwise view acquired data.

Acquired data may be provided to users to permit the users to publish and/or analyze the acquired data, such as to access, query, browse, or otherwise view acquired data.

Acquired data may be provided to one or more systems as data and/or data feeds to publish and/or analyze the acquired data, and to present results to a user.

Data acquisition and merging may be performed on-demand from one or more external sources in response to a database query. This may be appropriate for external sources which are either too large or too fast-changing to make full caching desirable. For such sources, the newly merged-in data may be stored only temporarily, i.e., purged immediately after the processing of each query, or purged on a schedule appropriate to that source's rate of data change.

Data acquisition may include and/or be directed to, for example and without limitation, one or more of festival and entertainment events, travel and tourist attractions, hotel listings, restaurant listings, entertainment review domains, Internet domain name sales and auctions, vacation and timeshare rental data, real estate data, any type of government provided data, insurance data domains, airport and destination-based travel data, business investment data management, startup information domains, venture capital firm data, freight forwarding, consignment shipping, parcel shipping, ground, air, and sea transportation and travel scheduling and routing, pharmaceutical and life sciences applications, conference tracking, game and sport tournament domains, club and association management, fantasy sports data, human resource data management, competitive price monitoring, competitive advertising campaign monitoring, consumer and business comparative shopping, book and library applications, job listings, search engine marketing site support, product and service award and honor data, and music and recording industry data.

10. Exemplary Systems

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause an appropriately configured computer system to perform one or more functions and/or combinations of functions disclosed herein.

Figure 13:
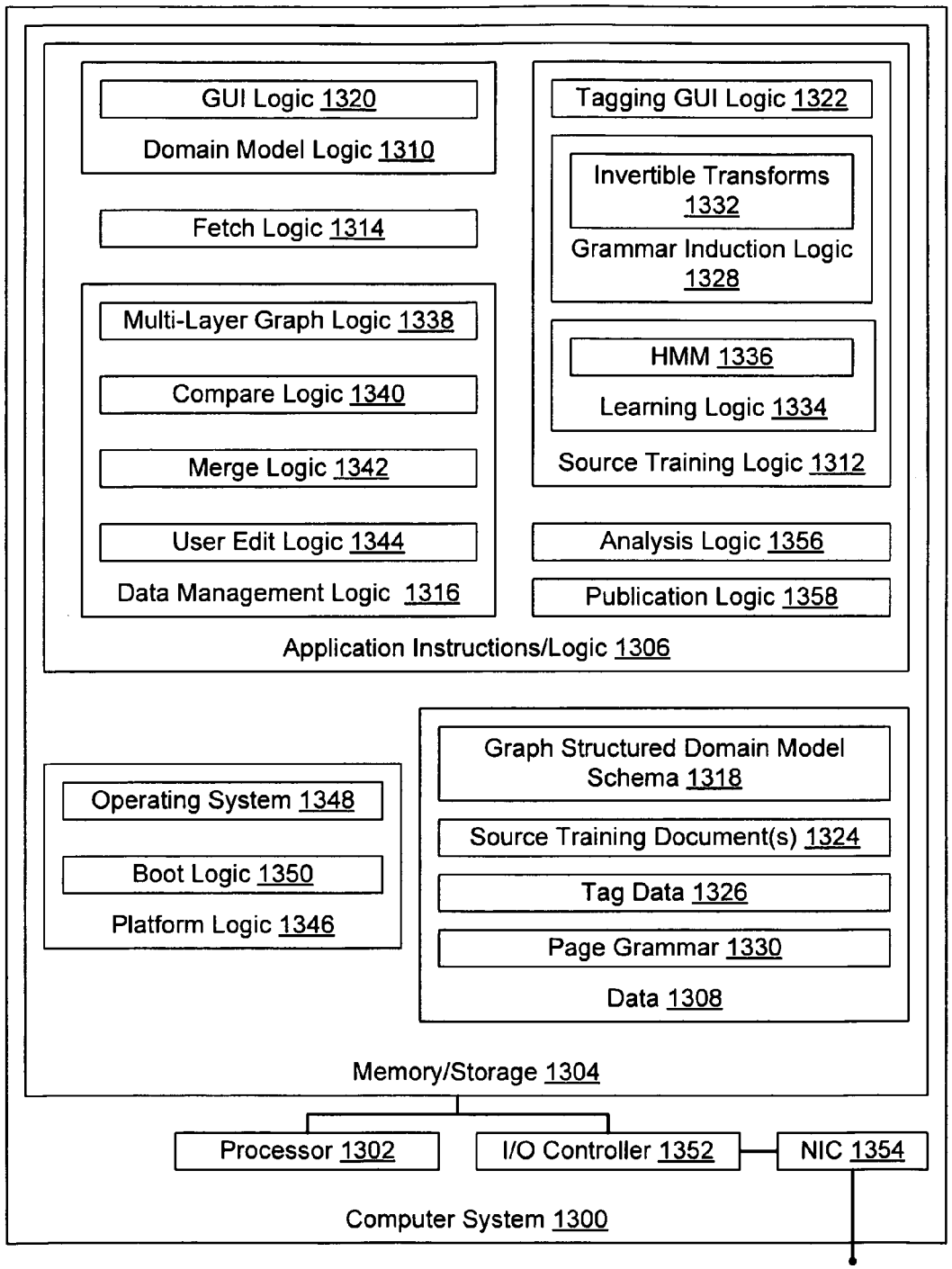
FIG. 13 is a block diagram of an exemplary computer system.

FIG. 13 is a block diagram of an exemplary computer system 1300, including one or more computer instruction processing units, illustrated here as processor 1302, to execute computer program product logic, also known as instructions, code, and software.

Computer system 1300 includes memory/storage 1304, including a computer readable medium having computer program product logic or instructions 1306 stored thereon to cause processor 1302 to perform one or more functions in response thereto.

Memory/storage 1304 further includes data 1308 to be used by processor 1302 in executing instructions 1306, and/or generated by processor 1302 in response to execution of instructions 1306.

Logic 1306 may include one or more of domain model logic 1310, source training logic 1312, fetch logic 1314, and data management logic 1316.

Domain model logic 1310 may include logic to cause processor 1302 to implement a graph structured domain model schema 1318 within data 1308, such as described in one or more examples above.

Domain model logic 1310 may include GUI logic 1320 logic to cause processor 1302 to receive user input to define entities, relationships, and cardinalities with respect to graph structured domain model schema 1318, such as described in one or more examples above.

Source training logic 1312 may include tagging GUI logic 1322 to cause processor 1302 to render one or more source documents 1324 and to receive user input tag data 1326 corresponding to the one or more source documents 1324, such as described in one or more examples above.

Source training logic 1312 may include grammar induction logic 1328 to cause processor 1302 to induce or define a page grammar 1330 corresponding to the one or more source documents 1324 and tag data 1326, such as described in one or more examples above.

Grammar induction logic 1328 may include heuristic logic to cause processor 1302 to heuristically search a set of invertible grammar transformation operators to identify a sequence of inverse transforms 1332 that invertibly convert between page grammar 1330 and a domain grammar corresponding to graph structured domain model schema 1318, such as described in one or more examples above.

Source training logic 1312 may include learning logic 1334 to cause processor 1302 to train a HMM 1336 to extract data in accordance with page grammar 1330, such as described in one or more examples above.

Processor 1302 may convert the extracted or parsed data to the domain grammar of graph structured domain model schema 1318, under control of the sequence of invertible grammar transforms 1332, such as described in one or more examples above.

Fetch logic 1314 may include logic to cause processor 1302 to access information sources for which HMM 1336 is trained to parse.

Data management logic 1316 may include logic to cause processor 1302 to manage data parsed by HMM 1336.

Data management logic 1316 may include multi-layer graph logic 1338 to cause processor 1302 to implement graph structured domain model schema 1318 as a multi-layer graph, such as described in one or more examples above.

Data management logic 1316 may include compare logic 1340 to cause processor 1302 to compare newly acquired information with existing information within domain model schema 1318, such as described in one or more examples above.

Data management logic 1316 may include merge logic 1342 to cause processor 1302 to selectively merge newly acquired data and/or newly added nodes within domain model schema 1318, such as described in one or more examples above.

Data management logic 1316 may include user edit logic 1344 to cause processor 1302 to edit information within domain model schema 1318, in response to user input, such as described in one or more examples above.

Computer system 1300 may include analysis logic 1356 to cause processor 1302 to analyze information within domain model schema 1318, such as described in one or more examples above.

Computer system 1300 may include publication logic 1358 to cause processor 1302 to publish information from domain model schema 1318, such as described in one or more examples above.

Computer system 1300 may include platform logic 1346.

Platform logic 1346 may include operating system logic 1348 to cause processor 1302 to provide an operating environment within which processor 1302 executes logic 1306. Operating system logic 1348 may include logic to present a virtual view of at least a portion of memory/storage 1304 to logic 1306, or portions thereof, and may provide an interface between logic 1306 and one or more physical devices associated with computer system 1300.

Platform logic 1346 may include boot logic 1350, which may include one or more of basic input/output system (BIOS) logic and extensible firmware interface (EFI) logic, and which may include logic to initialize one or more hardware and/or software features, such as device drivers, associated with computer system 1300. Boot logic 1350, or portions thereof, may be maintained within system memory and/or firmware.

Logic 1306, or portions thereof, may be specifically configured to be compatible with one or more of processor 1302 and platform logic 1346.

Computer system 1300 may include an input/output (I/O) controller 1352 to interface between computer system 1300 and other systems.

Computer system 1300 may include a network interface card (NIC) 1354 to interface between I/O controller 1352 and one or more networks, and processor 1302 may acquire data from one or more information sources through NIC 1354, and/or may publish acquired information from graph structured domain model schema 1318 though NIC 1354.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A non-transitory computer readable storage medium storing at least one program configured for execution by at least one processor of a computer system, the at least one program comprising instructions to:
   obtain a domain model comprising a set of entity types having corresponding properties and relationships between entities in a set of entities, wherein the domain model is characterized by a domain grammar;
   receive a first tag layout of a first source document obtained from a first information source associated with the domain model, the first tag layout comprising:
      (i) a plurality of user-provided navigational tags, wherein
         a user-provided navigational tag in the plurality of a user-provided navigational tags indicates a navigational position of the first source document relative to a second source document, from the first information source, navigationally connected with the first source document, and
      (ii) a plurality of corresponding user-identified tokens in the first source document, wherein
         a user-identified token in the plurality of corresponding user-identified tokens includes a portion of content of the first source document;
   select a page grammar in plurality of page grammars for the first source document in accordance with the plurality of user provided navigational tags;
   extract information from a third source document having a predefined degree of tag layout similarity to the first source document using the page grammar, wherein the second source document is obtained from a second information source; and
   transform the information extracted from the second source document in accordance with the domain grammar, thereby extracting and integrating information from a plurality of information sources.

2. The non-transitory computer readable storage medium of claim 1, wherein the instructions to select the page grammar for the first set of source documents comprises heuristically identifying a first sequence of grammar transformations $\{(G \rightarrow G')_1, \ldots, (G \rightarrow G')_n\}$ that transforms the domain grammar to the page grammar.

3. The non-transitory computer readable storage medium of claim 2, wherein
   each respective grammar transformations $(G \rightarrow G')_i$ in the first sequence of grammar transformations is invertible by a corresponding grammar transformation $(G' \rightarrow G)_i$, in a second sequence of grammar transformations $\{(G' \rightarrow G)_1, \ldots, (G' \rightarrow G)_n\}$, that undoes an effect of the transformation $(G \rightarrow G')_i$ with respect to the domain grammar, and
   the instructions to transform information comprise using the second sequence of grammar transformations to structurally transform information extracted from the second set of source documents to the format of the domain grammar.

4. A system for extracting and integrating information from one or more sources, comprising:
   at least one processor;
   memory; and
   at least one program stored in the memory and executable by the at least one processor, the at least one program comprising instructions to:
   obtain a domain model comprising a set of entity types having corresponding properties and relationships between entities in a set of entities, wherein the domain model is characterized by a domain grammar;
   receive a first tag layout of a first source document obtained from a first information source associated with the domain model, the first tag layout comprising;
      (i) a plurality of user-provided navigational tags, wherein
         a user-provided navigational tag in the plurality of a user-provided navigational tags indicates a navigational position of the first source document relative to a second source document, from the first information source, navigationally connected with the first source document, and
      (ii) a plurality of corresponding user-identified tokens in the first source document, wherein
         a user-identified token in the plurality of corresponding user-identified tokens includes a portion of content of the first source document;
   select a page grammar in plurality of page grammars for the first source document in accordance with the plurality of user provided navigational tags;
   extract information from a third of source document having a predefined degree of tag layout similarity to the first source document using the page grammar, wherein the second source document is obtained from a second information source; and
   transform the information extracted from the second source document in accordance with the domain grammar, thereby extracting and integrating information from a plurality of information sources.

5. A computer-implemented method for extracting and integrating information from one or more sources, comprising:
   obtaining a domain model comprising a set of entity types having corresponding properties and relationships between entities in a set of entities, wherein the domain model is characterized by a domain grammar;
   receiving a first tag layout of a first source document obtained from a first information source associated with the domain model, the first tag layout comprising:
      (i) a plurality of user-provided navigational tags, wherein
         a user-provided navigational tag in the plurality of a user-provided navigational tags indicates a navigational position of the first source document relative to a second source document, from the first information source, navigationally connected with the first source document, and
      (ii) a plurality of corresponding user-identified tokens in the first source document, wherein
         a user-identified token in the plurality of corresponding user-identified tokens includes a portion of content of the first source document;
   selecting a page grammar in plurality of page grammars for the first source document in accordance with the plurality of user provided navigational tags;
   extracting information from a third of source document having a predefined degree of tag layout similarity to the first source document using the page grammar, wherein the second source document is obtained from a second information source; and transforming the information extracted from the second source document in accordance with the domain grammar, thereby extracting and integrating information from a plurality of information sources.

6. The non-transitory computer readable storage medium of claim 1 wherein the page grammar for the first set of documents is selected by running a Viterbi algorithm on the tag layout.

7. The system of claim 4 wherein the page grammar for the first set of documents is selected by running a Viterbi algorithm on the tag layout.

8. A computer-implemented method of claim 5 wherein the page grammar for the first set of documents is selected by running a Viterbi algorithm on the tag layout.

9. The non-transitory computer readable storage medium of claim 1, wherein a token in the corresponding user-identified tokens comprises a word, a number, a punctuation character, an HTML element, a link or hyperlink, a form button, a control character, an image, an audio file, or a video file in a source document in the first set of source documents.

10. The system of claim 4, wherein a token in the corresponding user-identified tokens comprises a word, a number, a punctuation character, an HTML element, a link or hyperlink, a form button, a control character, an image, an audio file, or a video file in a source document in the first set of source documents.

11. The computer-implemented method of claim 5, wherein a token in the corresponding user-identified tokens comprises a word, a number, a punctuation character, an HTML element, a link or hyperlink, a form button, a control character, an image, an audio file, or a video file in a source document in the first set of source documents.

12. The non-transitory computer readable storage medium of claim 1, wherein a user-provided navigational tag in the plurality of user-provided navigational tags comprises one or more tokens in a source document in the first set of source documents.

13. The system of claim 4, wherein a user-provided navigational tag in the plurality of user-provided navigational tags comprises one or more tokens in a source document in the first set of source documents.

14. The computer-implemented method of claim 5, wherein a user-provided navigational tag in the plurality of user-provided navigational tags comprises one or more tokens in a source document in the first set of source documents.

15. The non-transitory computer readable storage medium of claim 1, wherein the first information associated with the domain model comprise a database, a spreadsheet, a web service feed, or an external website.

16. The system of claim 4, wherein the first information associated with the domain model comprise a database, a spreadsheet, a web service feed, or an external website.

17. The computer-implemented method of claim 5, wherein the first information associated with the domain model comprise a database, a spreadsheet, a web service feed, or an external website.

18. The system of claim 4, wherein the instructions to select the page grammar for the first set of source documents comprises heuristically identifying a first sequence of grammar transformations $\{(G \rightarrow G')_1, \ldots, (G \rightarrow G')_n\}$ that transforms the domain grammar to the page grammar.

19. The system of claim 18, wherein each respective grammar transformations $(G \rightarrow G')_i$ in the first sequence of grammar transformations is invertible by a corresponding grammar transformation $(G' \rightarrow G)_i$, in a second sequence of grammar transformations $\{(G' \rightarrow G)_1, \ldots, (G' \rightarrow G)_n\}$, that undoes an effect of the transformation $(G \rightarrow G')_i$ with respect to the domain grammar, and the instructions to transform information comprise using the second sequence of grammar transformations to structurally transform information extracted from the second set of source documents to the format of the domain grammar.

20. The computer-implemented method of claim 5, wherein the instructions to select the page grammar for the first set of source documents comprises heuristically identifying a first sequence of grammar transformations $\{(G \rightarrow G')_1, \ldots, (G \rightarrow G')_n\}$ that transforms the domain grammar to the page grammar.

21. The computer-implemented method of claim 2, wherein each respective grammar transformations $(G \rightarrow G')_i$ in the first sequence of grammar transformations is invertible by a corresponding grammar transformation $(G' \rightarrow G)_i$, in a second sequence of grammar transformations $\{(G' \rightarrow G)_1, \ldots, (G' \rightarrow G)_n\}$, that undoes an effect of the transformation $(G \rightarrow G')_i$ with respect to the domain grammar, and the instructions to transform information comprise using the second sequence of grammar transformations to structurally transform information extracted from the second set of source documents to the format of the domain grammar.

22. The non-transitory computer readable storage medium of claim 2, wherein a grammar transformation in the first sequence of grammar transformations comprises a lift(R), permute(P), multi-choice-permute(P), factor(P), require(R), unloop(R), set-cardinality(G), choice(P) or interleave(R) grammar operator.

23. The system of claim 18, wherein a grammar transformation in the first sequence of grammar transformations comprises a lift(R), permute(P), multi-choice-permute(P), factor(P), require(R), unloop(R), set-cardinality(G), choice(P) or interleave(R) grammar operator.

24. The computer-implemented method of claim 20, wherein a grammar transformation in the first sequence of grammar transformations comprises a lift(R), permute(P), multi-choice-permute(P), factor(P), require(R), unloop(R), set-cardinality(G), choice(P) or interleave(R) grammar operator.

* * * * *

UNITED STATES PATENT AND TRADEMARK OFFICE
CERTIFICATE OF CORRECTION

| | | |
|---|---|---|
| PATENT NO. | : 8,805,861 B2 | Page 1 of 1 |
| APPLICATION NO. | : 12/467235 | |
| DATED | : August 12, 2014 | |
| INVENTOR(S) | : Boyan et al. | |

It is certified that error appears in the above-identified patent and that said Letters Patent is hereby corrected as shown below:

In the claims,

Claim 4, col. 28, line 31, please delete "third of source" and insert --third source--; and Claim 5, col. 28, line 66, please delete "third of source" and insert --third source--.

Signed and Sealed this
Twenty-first Day of October, 2014

Michelle K. Lee
*Deputy Director of the United States Patent and Trademark Office*